United States Patent [19]
Klein et al.

[11] Patent Number: 6,145,102
[45] Date of Patent: *Nov. 7, 2000

[54] TRANSMISSION OF AN ERROR MESSAGE OVER A NETWORK BY A COMPUTER WHICH FAILS A SELF-TEST

[75] Inventors: Philippe Klein, Jerusalem; Simoni Ben-Michael, Givat Zeev; Avraham Menachem, Ramote; Sarit Shvimmer, Bait-Shemesh, all of Israel

[73] Assignee: Compaq Computer Corporation, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 09/009,084

[22] Filed: Jan. 20, 1998

[51] Int. Cl.[7] .............................. G06F 11/20; G01R 31/38
[52] U.S. Cl. ................................ 714/47; 714/48; 714/56; 714/57
[58] Field of Search ................................ 714/47, 48, 41, 714/43, 44, 57, 56, 25

[56] References Cited

U.S. PATENT DOCUMENTS

| | | | |
|---|---|---|---|
| 4,438,490 | 3/1984 | Wilder, Jr. | 714/47 |
| 5,257,384 | 10/1993 | Farrand et al. | 710/105 |
| 5,274,797 | 12/1993 | Barlow et al. | 714/47 |
| 5,317,693 | 5/1994 | Cuenod et al. | 710/9 |
| 5,367,670 | 11/1994 | Ward et al. | 714/47 |
| 5,402,431 | 3/1995 | Saadeh et al. | 714/47 |
| 5,432,715 | 7/1995 | Shigematsu et al. | 714/47 |
| 5,485,576 | 1/1996 | Fee et al. | 714/56 |
| 5,522,042 | 5/1996 | Fee et al. | 714/2 |
| 5,636,342 | 6/1997 | Jeffries | 714/48 |
| 5,682,552 | 10/1997 | Kuboki et al. | 710/52 |
| 5,696,701 | 12/1997 | Burgess et al. | 714/47 |
| 5,708,775 | 1/1998 | Nakamura | 714/47 |
| 5,864,653 | 1/1999 | Tavallaei et al. | 395/181 |

OTHER PUBLICATIONS

Danbury and Goff, Small Area Networks using Serial Data Transfer—I2C Bus with Multiple Masters, Electronic Engineering, Apr. 1994, pp. 85–95.
I2C Bus and How To Use It, Philip Semiconductor, Apr. 1995, pp. 1–24.
PCF 84C00, 8–Bit Microcontrolled with I2C interface, Philip Semiconductors Integrated Circuits, Nov. 1996, pp. 2–23.
ISO/IEC 8802–3: 1996(E), ANSI/IEEE Std 802.3, p. 2.
Philip Semiconductors Web Pages, 1997.

*Primary Examiner*—Ly V. Hua
*Attorney, Agent, or Firm*—Cesari and McKenna, LLP

[57] ABSTRACT

A computer may have a management bus installed, where the management bus is coupled to sensors which monitor status of components of the computer. The management bus may also be coupled to a management bus processor, where the management bus processor receives status information from the management bus concerning status of components of the computer. An interface between the management bus and the network subsystem permits transmission of an error message in the event that the computer has a failure which inactivates the system CPU, the system bus, the system memory, or the system power supply.

14 Claims, 17 Drawing Sheets

SEND BYTE PROTOCOL

SEND BYTE PROTOCOL:

THE SEND BYTE PROTOCOL DECODES AS FOLLOWS
(RECEIVED LEFT TO RIGHT):
START CONDITION, 7 BITS OF ADDRESS, 1 BIT WR,
ACK, 1 BYTE COMMAND, ACK, STOP CONDITION.

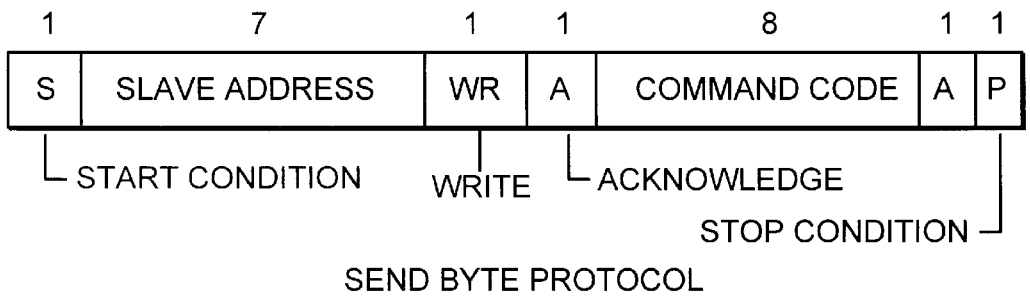

SEND BYTE PROTOCOL

FIG. 21

1. START_DELIMITER:

START_DELIMITER SHOULD BE SEND EACH TIME A NEW PACKET IS
TRANSFERRED OVER THE I²C BUS.

COMMAND CODE: 0000CP01 (BINARY)

• C: ADD CRC
  WHEN THIS BIT IS SET, THE 2114X WILL CALCULATE AND APPEND
  THE CRC TO THE TRANSMITTED PACKET.

• P: DISABLE PADDING
    WHEN THIS BIT IS SET, THE 2114X WILL NOT ADD
    PADDING TO THE PACKET. WHEN THIS BIT IS RESET
    TO ZERO, THE 2114X WILL APPEND ZERO BYTES TO
    PACKETS SHORTER THAN 64 BYTES. PACKETS THAT
    WILL BE PADDED WILL ALSO HAVE CRC CALCULATED
    AND APPEND REGARDLESS OF THE ADD CRC BIT.

| C | P | |
|---|---|---|
| 1 | 0 | PADDING AND CRC ARE ADDED BY THE 2114X |
| 1 | 1 | CRC ONLY ADDED BY THE 2114X |
| 0 | 1 | NO PADDING AND NO CRC ADDED BY THE 2114X |
| 0 | 0 | INVALID |

FIG. 22

TRANSMISSION OF AN ERROR MESSAGE OVER A NETWORK BY A COMPUTER WHICH FAILS A SELF-TEST

FIELD OF THE INVENTION

This invention relates to a computer connected to a network, and more particularly to a computer, which in the event of a failure which prevents transfer of packets on the system bus, enables the computer to send status messages onto the network.

BACKGROUND

A network interface in a computer ordinarily transmits packets onto the network, where the packets are delivered to the interface by a system bus transferring the packets from a memory of the computer. Also, packets received from the network are ordinarily transferred by the system bus from the interface to memory. Occasionally a fault will occur in the computer, where the fault prevents packets from being transferred by the system bus between the memory and the network interface.

There is needed, in the event of a failure of a component of a computer such as the system bus or the main processor, a means for the computer to transmit information onto the network to another computer, so that notice of the failure is brought to the attention of the proper authorities. The proper authorities may be either a person, a management software application, or some other entity monitoring operation of computers connected to the network.

SUMMARY OF THE INVENTION

A computer may have a management bus installed, where the management bus is coupled to sensors which monitor status of components of the computer. The management bus may also be coupled to a management processor, where the management processor receives status information from the management bus concerning status of components of the computer. An interface between the management bus and the network subsystem permits transmission of an error message in the event that the computer has a failure which inactivates the system CPU, the system bus, the system memory, or the system power supply.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

FIG. 21 is a field diagram of a send byte protocol.

FIG. 22 is a field diagram of a start delimiter

DETAILED DESCRIPTION

Figure 1:
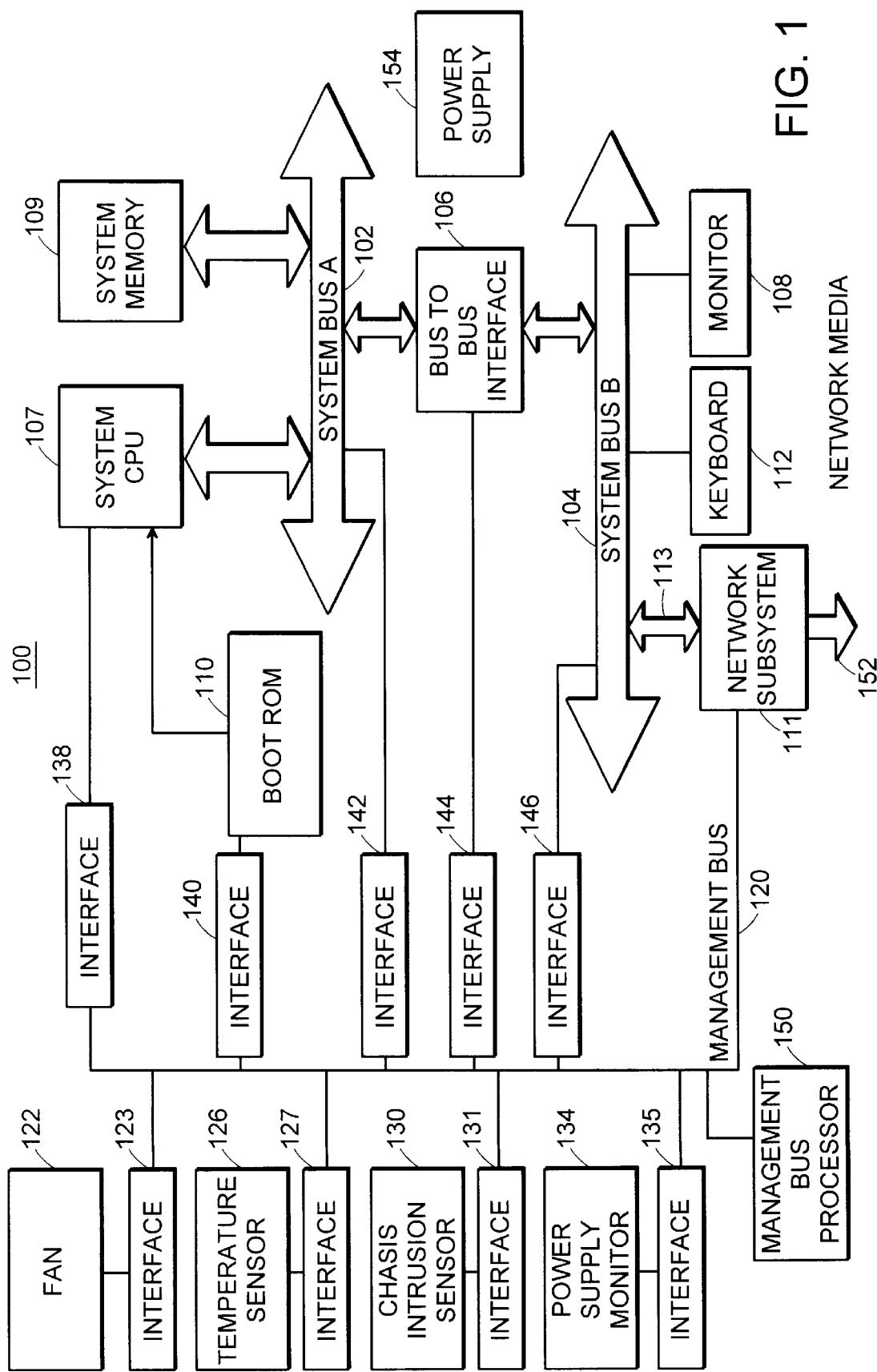
FIG. 1 is a block diagram of a computer system.

Turning now to FIG. 1, a fault may occur during operation of a computer 100. For example, a system bus A 102 or system bus B 104 may fail so that it can no longer transfer messages between units of the computer. The computer tOO is shown as a complex system with a two system buses 102, 104 linked by a bus to bus interface 106. System CPU 107 and system memory 109 are both coupled to system bus A 102, where, for example, system bus A provides a high speed communication path between system CPU 107 and system memory 109. System bus B 104 provides a lower speed connection for input or output, and is shown connected to the network subsystem 111, the monitor 108, and the keyboard 112. Bus connection 113 connects network subsystem 111 with system bus B 104.

Also, a component may fail. And with the component failure, any of the system buses may be dragged down so the entire computer 100 fails. Upon the failure of a component of a computer, it is desirable for a technician to run a diagnostic program in order to have the program report the nature of the fault. If the fault is not too serious, such a program can execute, and can report what it finds to be the nature of the fault. The diagnostic program usually presents a message on the screen of a monitor 108 attached to the computer, so that the technician can read the message, and then the technician takes the appropriate corrective action.

A further method to diagnose a fault in a computer is for the computer 100 to execute a self test. A computer is often commanded to execute a self test. A self test may be executed upon boot up of the computer, for example, by the computer 100 reading self test instructions from a boot ROM 110. Also, a self test may be executed during operation of the computer by a user initiating a command to execute the self test by entering a command from a keyboard 112. A computer may pass the self test, or alternatively, the computer may fail the self test. Upon failure of the self test, the computer usually presents an error message on the screen of the monitor 108. The message is read by a user who interprets the message, and the user then initiates action to repair the computer.

Figure 5:
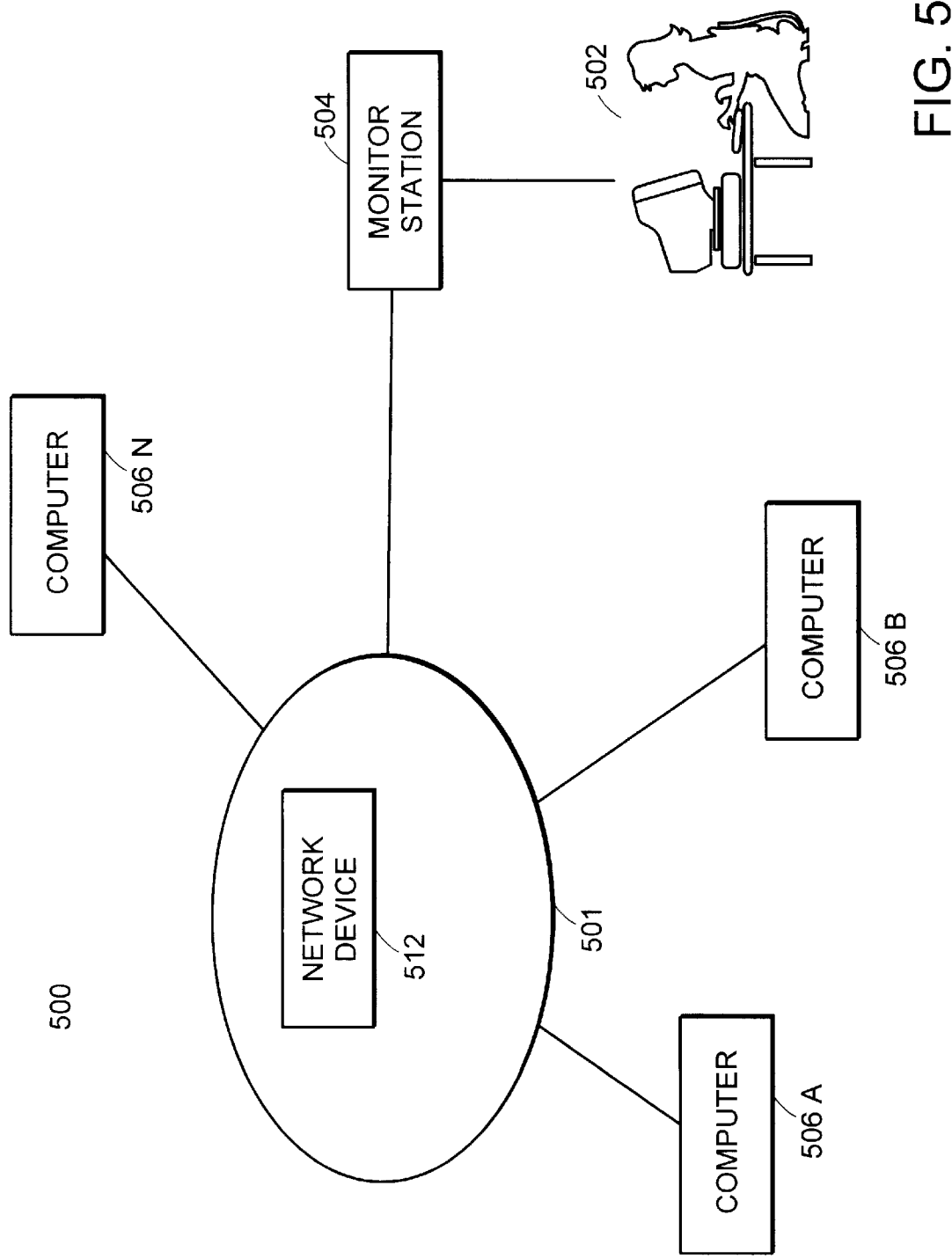
FIG. 5 is a block diagram of a network.

Operation of a computer network 500, as shown in FIG. 5 with network cloud 501, is often controlled by a person designated as a manager 502. The manager 502 has a computer, designated monitor station 504, connected to the network 500. The manager's computer can execute commands which initiate actions in the various computers 506A, 506B, 506N, etc. connected to the network. There may be hundreds or thousands of computers 506A . . . 506N connected to the network cloud 501. The manager's computer 504 can often be used to read status information concerning various computers connected to the network. Also, the manager's computer 504 can be used to control and read status from network devices 512 installed within the network.

Also, a manager may be able to initiate a diagnostic program to run on a remote computer 506A . . . 506N, or on a network device 512 by the transfer of a command in a management packet over the network to the remote computer.

A problem in network management is presented when a computer fails a diagnostic test or fails a self test. A computer which fails a test is at least partly inoperative, and often the CPU, the memory unit, or the system bus of the computer failing the test is not functioning. An inoperative computer cannot transmit a message over the network, and so the manager is not aware of the problem with the inoperative computer.

Also, network devices such as repeaters, routers, bridges, brouters, switches, servers, etc. may be required to execute a diagnostic test. In the event that the processor in a network device is inoperative, then the network device simply fails to respond to the manager's command to execute the diagnostic test. Network devices are often installed in "network closets", which are small rooms distributed in many buildings. The buildings may be near to each other, such as clustered on a "campus". Alternatively, the buildings may be in different cities, different states, or on different continents. The common thread is that all of the network devices are connected by the computer network. It is very desirable for a technician at one location to be able to run diagnostic programs, to boot up a network device, and to monitor the result of the diagnostic program, or the result of an attempted boot up of a network device. Hereinafter a network device is included within the meaning of the general term "computer".

Computer 100 has a management bus 120, where management bus 120 is coupled to sensors which monitor status of components of the computer. For example, a fan 122 which provides cooling for the computer is connected to interface 123, and interface 123 is coupled to management bus 120.

Also, for example, temperature sensor 126 is coupled to interface 127, and interface 127 is coupled to management bus 120. Several temperature sensors can be installed in order to monitor temperatures at different locations within the chassis of the computer.

Also, for example, chassis intrusion sensor 130 is coupled to interface 131, and interface 131 is coupled to management bus 120. The power supply can be turned off in the event of a chassis intrusion, that is, someone opens the chassis of the computer. Also, an alarm message signaling a chassis intrusion can be sent over the network to the system manager.

Also, for example, power supply monitor 134 monitors power supply voltages, and is coupled to interface 135. Interface 135 is coupled to management bus 120. The actual voltage and current on each power supply circuit can be monitored and reported to the system manager 502 by transmission of a message over the network. Alternatively, power supply monitor 134 can have limits set therein, and a message is transmitted to the system manager 502 in the event that a voltage or current exceeds the set limits.

Also, for example, interface 138 couples the system CPU 107 to management bus 120. Parameters indicating the activity of the CPU can be placed in a message which is transmitted to the system manager 502.

Also, for example, boot ROM interface 140 couples boot ROM 110. Boot ROM interface 140 can command the computer to perform a boot in order to re-initialize the computer. Alternatively, boot ROM interface 140 reports the result of an attempted boot to the management bus 120, and the result can be placed in a message which is transmitted to the system manager 502. The result of an attempted boot, as transmitted over the network by the invention, can tell the system manager 502 whether or not the attempted boot was successful.

Also, for example, interface 142 couples system bus A 102 to management bus 120. Activity on the system bus A 102 can then be reported to the system manager 502 by transmission of a message over the network.

Also, for example, interface 144 couples bus-to-bus interface 106 to management bus 120. Activity on the bus-to-bus interface 106 can then be reported to the system manager 502 by transmission of a message over the network.

Also, for example, interface 146 couples system bus B 104 to management bus 120. Activity on the system bus B 104 can then be reported to the system manager 502 by transmission of a message over the network.

The management bus 120 is coupled to a management bus processor 150, where the management bus processor 150 receives status information from the management bus 120 concerning status of components of the computer. Also, the management bus processor 150 can issue commands to the various interfaces to management bus 120 in order to control some of the components. For example, the fan 122 can be commanded to run faster or slower, depending upon a reading from the temperature sensor 126. Also, for example, the power can be turned off by power supply monitor 134 in the event that the chassis intrusion sensor 130 reports that the chassis has been opened. Management bus processor 150 is alternatively referred to as the management bus controller.

Figure 4:
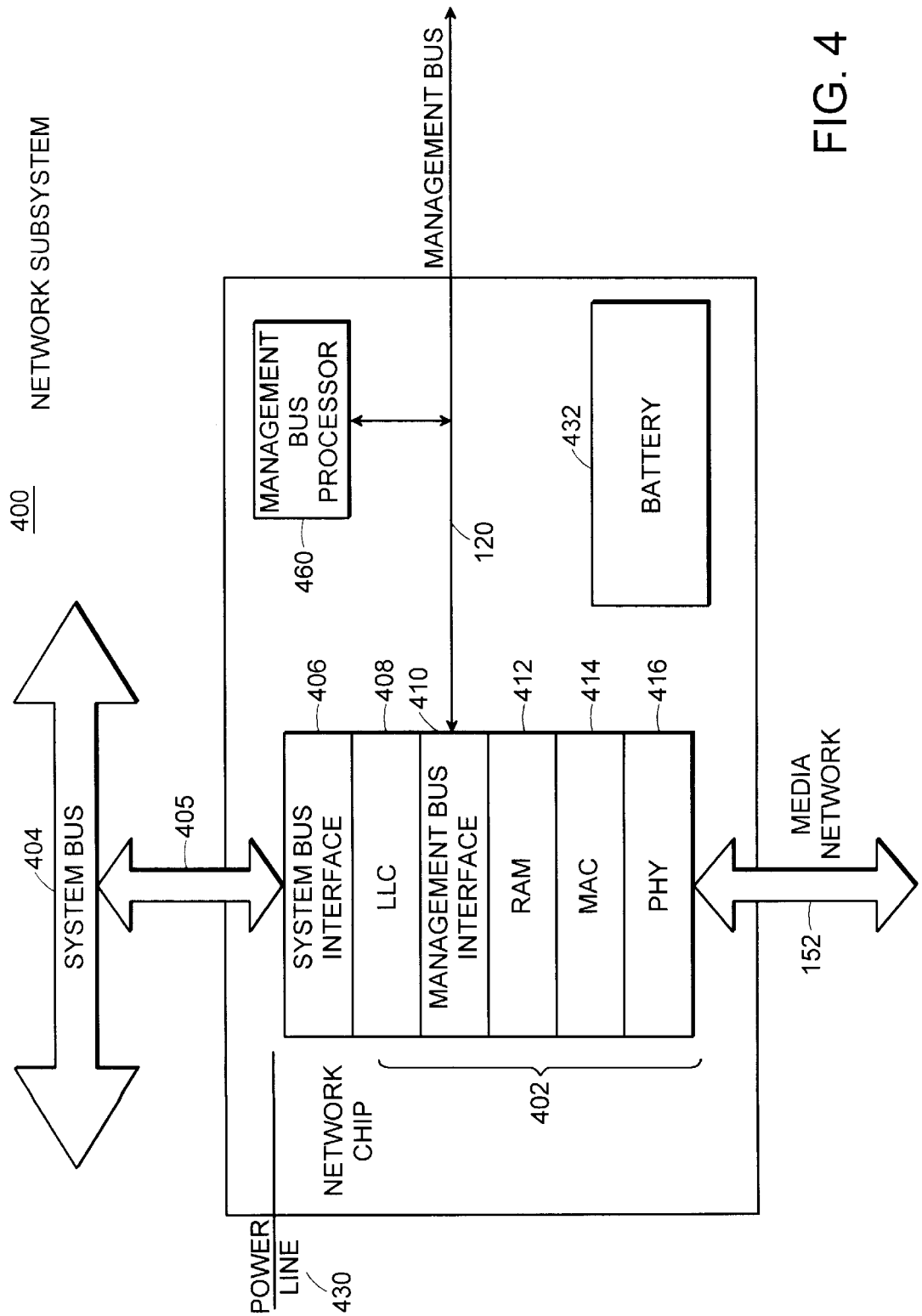
FIG. 4 is a block diagram of a network subsystem.

Management bus 120 is coupled to the network subsystem 111 so that status information passed to the management bus 150 is collected into a packet by the management bus processor 120 and delivered to the MAC machine 414 (as shown in FIG. 4) of the network subsystem 111. The management bus 120 can deliver packets to the MAC machine 414 of the network subsystem 111 totally independent the system bus 102, or system bus 104. The packets delivered by the management bus 120 are transmitted onto the network media 152 by the network subsystem 111. The packets so transmitted may be received by a network manager 502 (shown in FIG. 5), and so the network manager 502 becomes informed that a fault has occurred in the computer 100. The nature of the fault is also available to the network manager 502 as the status which the broken computer 100 can provide is carried in the packet delivered by the management bus 120 to the MAC machine 414.

The invention is a very clever improvement in the network subsystem which permits the delivery of packets to the MAC machine 414 of the network subsystem by a "backdoor" route. The MAC machine 414 ordinarily receives and transmits packets which pass over the system bus 102, 104.

The present invention opens a "backdoor" into the MAC machine 414, for the management bus 120 to transmit status information to the network manager 502.

The backdoor route permits status packets to be transmitted onto the network by the computer even though the entire computer system, except for DC power and the system clock, is inoperative. And, in an alternative embodiment of the invention, a rechargeable battery 432 (FIG. 4) mounted in the network subsystem frees transmission of status packets onto the network from system power supply 154. In another alternative embodiment of the invention, the transmit clock within network chip 402 (FIG. 4) is used to operate the invention, thereby freeing the transmission of status packets from the system clock.

Figure 2:
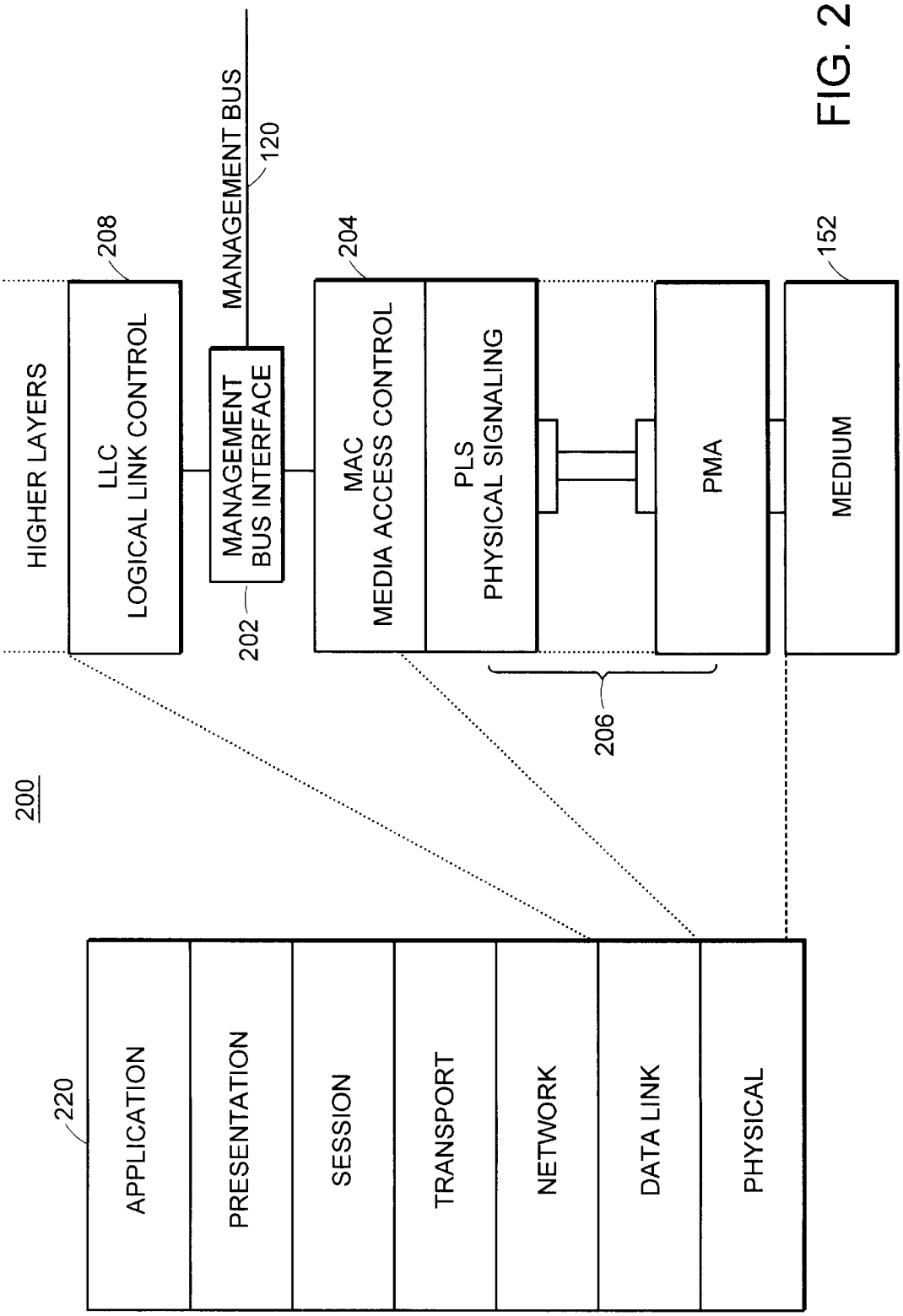
FIG. 2 is a diagram of a protocol stack of the invention.

Turning now to FIG. 2, a protocol stack 200 for the MAC machine 414 is shown. Also, a comparison with the Open Systems Interface (OSI) Standard protocol stack 220 is shown. (The OSI model is described in the textbook *Computer Networks, Second Edition*, by Andrew S. Tanenbaum, published by Prentice Hall, Englewood Cliffs, N.J., 1988, all disclosures of which are incorporated herein by reference. The OSI model is shown at page 20.) Interface 202 receives packets from management bus 120 and transfers the packets to the MAC protocol layer 204. MAC protocol layer 204 then transfers the packet to the physical layer 206 for transmission onto network media 152.

Figure 3:
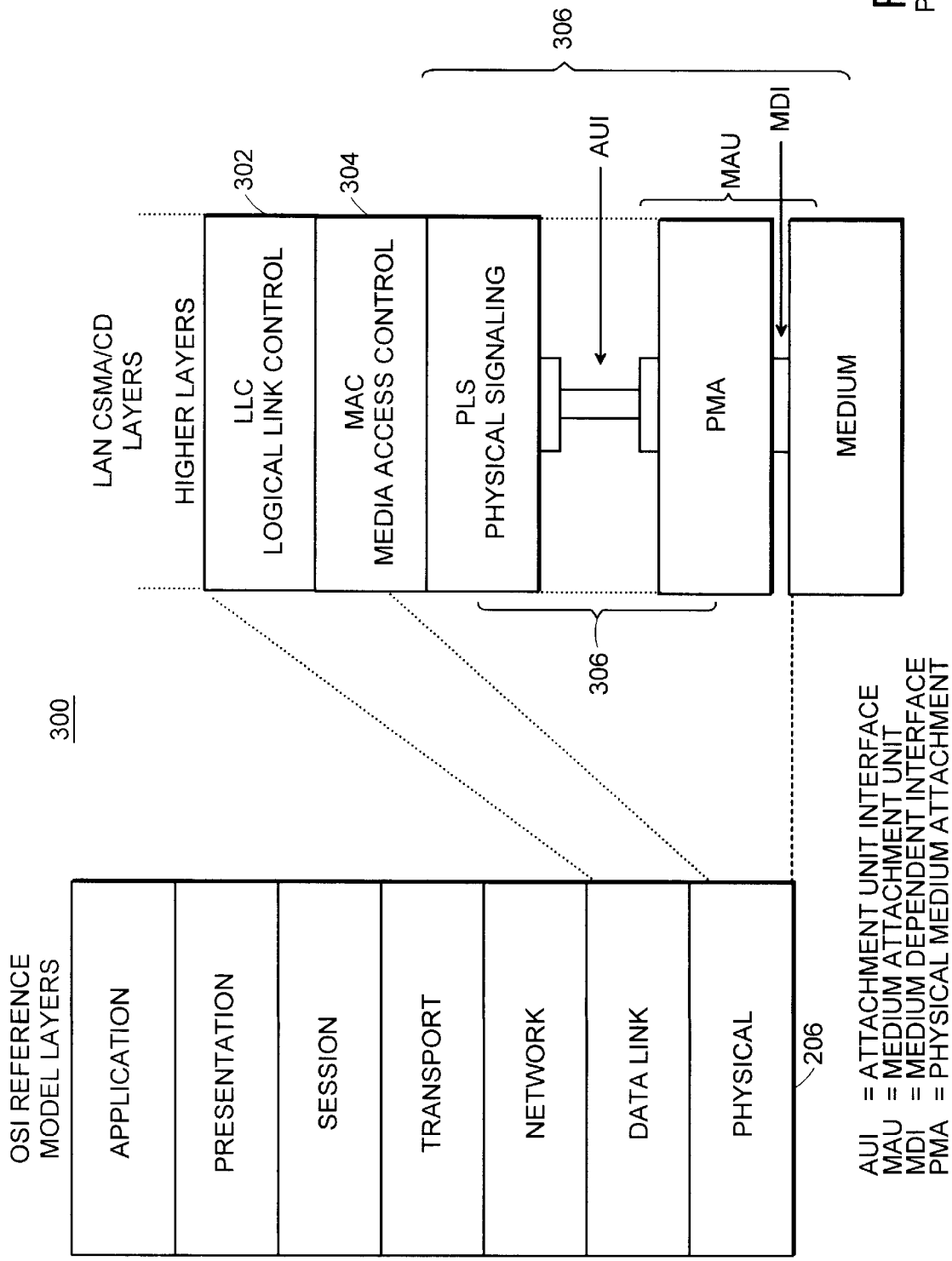
FIG. 3 is a diagram of a prior art protocol stack.

Turning now to FIG. 3, a prior art protocol stack 300 is shown. Protocol stack 300 is taken from the publication ISO/IEC 8802-3, ANSI/IEEE Std. 802.3, Fifth Edition Jul. 29, 1996, Part 3, "Carrier sense multiple access with collision detection (CSMA/CD) access method and physical layer specifications" at page 17, all disclosures of which publication are incorporated hereirrby reference.

The inventive LLC protocol layer 208 corresponds substantially to the standard LLC protocol layer 302, except that the inventive LLC protocol layer 208 interoperates with management bus interface 202.

The inventive MAC protocol layer 204 corresponds substantially to the standard MAC protocol layer 304, except that the inventive MAC protocol layer 204 interoperates with management bus interface 202.

The inventive physical protocol layer 206 corresponds substantially with the standard physical protocol layer 306, as the inventive physical layer 206 simply accepts and delivers packets to/from the MAC protocol layer 204, and delivers and accepts packets from/to the network media 152.

Turning now to FIG. 4, a block diagram of network subsystem 400 is shown. Network chip 402 is shown as implemented in a single silicon computer chip. Alternatively, network chip 402 may be implemented as a set of chips which are interconnected within network subsystem 400. Network chip 402 connects to system bus 404 through system bus interface 406. Bus connection 405 connects system bus interface 406 with system bus 404.

LLC machine 408, of network chip 402, implements the Logical Link Control sublayer 208 of the protocol stack 200 shown in FIG. 2.

Management bus interface 410, of network chip 402, connects to management bus 120, and also provides pass through of messages to and from LLC machine 408. Management bus interface 410 receives bytes from management bus 120, forms the bytes into network packets, and passes the packets formed from the management bus bytes to MAC machine 414. MAC machine 414 then passes the network packet containing the management bus bytes to the PHY machine 416, where the network packet is transmitted onto the network media 152.

In an alternative embodiment of the invention, RAM 412 contains data which is used in constructing the packet containing bytes received from management bus 120. For example, RAM 412 contains the destination address of the network packet containing management bus bytes. Also, for example, the management bus byte is read by management bus interface 410, and responsive to the contents of the byte, an error message is selected from a plurality of error messages stored in RAM 412. The error message is then included in the network packet transmitted in response to the management bus bytes. By using the management bus byte as a pointer to a standard error message, the system manager is not required to keep a list of interpretations of assorted bytes implemented by different manufacturers in different models of computers and network devices.

Further, by simply using the different management bus bytes which have been implemented by manufacturers of computers as pointers to error messages stored in RAM 412, problems with broken computers can be standardized for the assistance of the system manager 502. In operation, a network chip 402 with an empty RAM 412 is supplied to a computer manufacturer. The manufacturer then installs the network chip into a variety of computers. Each computer of the variety may use a different set of bytes on management bus 120 to indicate different status values, or different problems, within the computer. At boot-up time for the computer, software simply loads the RAM 412 with a table of bytes used in that particular computer, and with error messages appropriate to each byte in the table. Also the name, physical address, possibly the location by city and street address, the building floor number and pole number, and other identifying indicia of the computer are written into RAM 412 by software. For example, RAM 412 may have data written therein by management packets received from network media 152, and delivered to management bus interface 410. Then, when a byte is received by management bus interface 410 from management bus 120, the received byte is used as a pointer to the appropriate error message. The appropriate error message is then received by the system manager 502 so that he conveniently has only a standardized error message, the network address and/or name of the transmitting computer, and possibly the city and street address of the computer along with the building floor number and pole number of the computer.

In a further alternative embodiment of the invention, use of management bus 120 includes responding to a packet received from the network, and in response thereto, writing bytes to management bus 120. For example, the packet could be received from the network as a management packet, pass along the system bus B 104 and system bus A 102, and system memory 108. For example, system CPU 107 then responds through interface 138 to generate activity on management bus 120.

As a further example, management bus interface 138 may write bytes intended for registers of various interfaces 123, 126, 127, 131, 135, 138, 140, 142, 146, etc., in order to control monitoring of computer 100. For example, these bytes may be written directly into the registers by management bus interface 138 through management bus 120, or may be forwarded to management bus processor 460, and then written to the registers by management bus processor 460, depending upon the protocol adopted for management bus 120.

A method of remotely re-booting computer 100 by action of system manager 502 when computer 400 fails to respond to ordinary network packets is provided by commanding computer 100 to execute a boot routine through a management packet. The management packet is received by network subsystem 400, and causes network subsystem to execute a hardware boot of computer system 100. Boot ROM then causes computer system 100 to execute a boot process, and the various interfaces on management bus 120 will signal to the network subsystem 111 any failures which are detected during the boot process. Network subsystem 111 then transmits an error message signaling the failure onto network media 152.

As a further example, a management packet can be received from network 152, be transferred as a standard management packet through system bus 404 or through system bus B 104 to the computer system CPU. Computer system CPU can then initiate action, including initiating a software or a hardware boot cycle. In the event that the boot cycle fails, then a failure message may be transmitted through management bus 120 onto network media 150. For example, interface 138 to system CPU 107 can report the results of a boot cycle through management bus 120, or alternatively interface 140 to boot ROM 110 can report the results of a boot cycle through management bus 120, or alternatively interface 142 to system bus A 102 can report the results of a boot cycle through management bus 120, or alternatively interface 144 to bus-to-bus interface 106 can report the results of a boot cycle through management bus 120, and alternatively, interface 146 to system bus B 104 can report the results of a boot cycle through management bus 120. The results of the boot cycle are then packaged into a network data packet by network subsystem 111 and transmitted on network media 152 for reception by a system monitor station 504 or system manager 502.

As a still further example, in the event that a system crash occurs in computer 100, any one of the interfaces 138, 140, 142, 144, 146, etc., can report the crash through management bus 120 as a failure message for transmission onto network media 152.

RAM 412, of network chip 402, provides random access memory for management bus interface 410. For example, RAM 412 may store byte tables for bytes used on management bus 120, may store addresses such as the address of computer 100, the address of monitor workstation 504, and may store error messages selected in response to bytes received from management bus 120, and etc.

MAC machine 414, of network chip 402, implements the Medium Access Control protocol of layer 204 of the protocol stack 200 shown in FIG. 2. MAC machine 414 interoperates with management bus interface 410 to transmit network packets onto network media 152 in response to bytes received by management bus interface 410 from management bus 120. Also, MAC machine 414 interoperates with management bus interface 410 to transmit bytes onto management bus 120 in response to network packets received from network media 152.

PHY machine 416 implements the physical protocol of physical layer 206 of the protocol stack shown in FIG. 2.

Power line 430 brings electrical power from computer power supply 154 to network subsystem 400. Network subsystem 400 is maintained powered up even when computer 100 fails, or when computer 100 is operated at reduced power. Accordingly, network subsystem 400, through operation of network chip 402, can transmit error messages onto network media 152 when all of computer 100 is non-functional except the power supply 154 which supplies power to power line 430. As a further back-up, battery 432 energizes network subsystem 400 in the event that power on power line 430 fails. By use of back-up battery 432, network subsystem 400 can transmit error messages onto network media 152 even when power supply 154 fails, thereby placing computer 100 into substantially total fault.

As an example, back-up battery 432 is continuously trickle charged through power line 430 whenever computer 100 is turned on. Battery 432 is then ready to electrically energize network subsystem 400 for the purpose of transmitting error messages onto network media 152 upon the failure of power supply 154. When backup battery 432 is used to energize network subsystem 400, computer 100 can transmit error messages onto the network even though its power supply 154 is non-functional.

Management bus processor 460 is connected to management bus 120. Management bus processor 460 operates management bus 120. For example, interfaces 123, 126, 127, 131, 135, 138, 140, 142, 146, etc. coupled to management bus 120 may communicate with management bus processor 460. In turn, management bus processor 460 communicates with management bus interface 410 in network chip 402. Accordingly, a manufacturer can establish his preferred protocol for use of management bus 120 and management bus processor 460. Management bus processor 460 then simply packages bytes received from management bus 120 and transmits them, again on management bus 120 with an appropriate address, to management bus interface 410. Management bus interface 410 then transfers the bytes to MAC machine 414 for generation of a network packet for transmission onto network medium 152, as described hereinabove.

Further, management bus processor 460 can receive command messages or inquiry messages from management bus interface 410. In response to the command or inquiry messages, management bus processor 460 generates the appropriate message for management bus 120 and transmits the message to the appropriate interface 123, 126, 127, 131, 135, 138, 140, 142, 146, etc. coupled to management bus 120.

As an example, management bus processor 460 is shown mounted in network subsystem 400 so that management bus processor 460 is powered by battery 432 in the event that power supply 154 fails. Failure of power supply 154 therefore brings down the entire computer, except those items powered by emergency battery 432, and so in the event of a power supply 154 failure, the network subsystem 400 can still generate meaningful error messages and transmit them onto network media 152.

Turning now to FIG. 5, operation of a computer network 500 is shown. Network 500 has network cloud 501. Various computers 506A, 506B, ... 506N, etc. are connected to network cloud 501. Network cloud 501 may contain much complexity, or network cloud 501 may represent a simple local area network. In any event, network cloud 310 contains network devices such as are schematically represented by network device 512. Network devices contained within network cloud 501, and which are responsible for operation of the network, include but are not limited to, routers, repeaters, bridges, servers, gateways between network segments having different protocols, brouters, and including any device useful for operation of a computer network.

End station computers 506A, 506B, ... 506N are connected to network 500 through network cloud 501. There may be hundreds or thousands of computers 506A ... 506N connected to the network cloud 501.

Also, monitor station 504 is connected to network cloud 501. Monitor station 504 is used to monitor operation of network 500 by system manager 502. A network such as network 500 is often controlled by a person designated as a system manager 502, and system manager 502 makes use of monitor station 504. The manager can, through monitor station 504, execute commands which initiate actions in the various devices 512, and various end station computers 506A, 506B, . . . 506N, and can be used to read status information from various computers and network devices in network 500. Also, a system manager 502 may be able to initiate a diagnostic program to run on a remote computer 506A . . . 506N, or on a network device 512 by the transfer of a command in a management packet over the network to the remote computer or device. As explained above, the management packet may cause the network subsystem to execute a hardware boot, in which case any failure in the boot cycle will be reported, through management bus 120 and network media 152, back to the system manager 502.

When a system manager 502 initiates a command to be executed on a network device 512 or on a remote computer 506A, 506B, . . . 506N, then even though the computer is non-functional, an error message will be transmitted to the monitor station 504 by network subsystem 400 mounted within the non-functional computer or network device.

Turning now to FIG. 6 through FIG. 12, details of a preferred embodiment of management bus 120 are shown. Management bus 120 is, in the preferred embodiment, implemented in accordance with the I2C standard serial bus. "The I2C standard serial bus is described in the publication *The I2C Bus and How to Use It* (including specifications)", published by the Phillips Semiconductor company in April 1995, all disclosures of which publication are incorporated herein by reference. Also, in the preferred embodiment management bus processor 460 is implemented as the Phillips PCF84COO processor, described in the publication "*PCF84COO 8-bit Microcontroller with I2C bus interface*", published by Phillips Semiconductors on Nov. 25, 1996, all disclosures of which publication are incorporated herein by reference.

Figure 6:
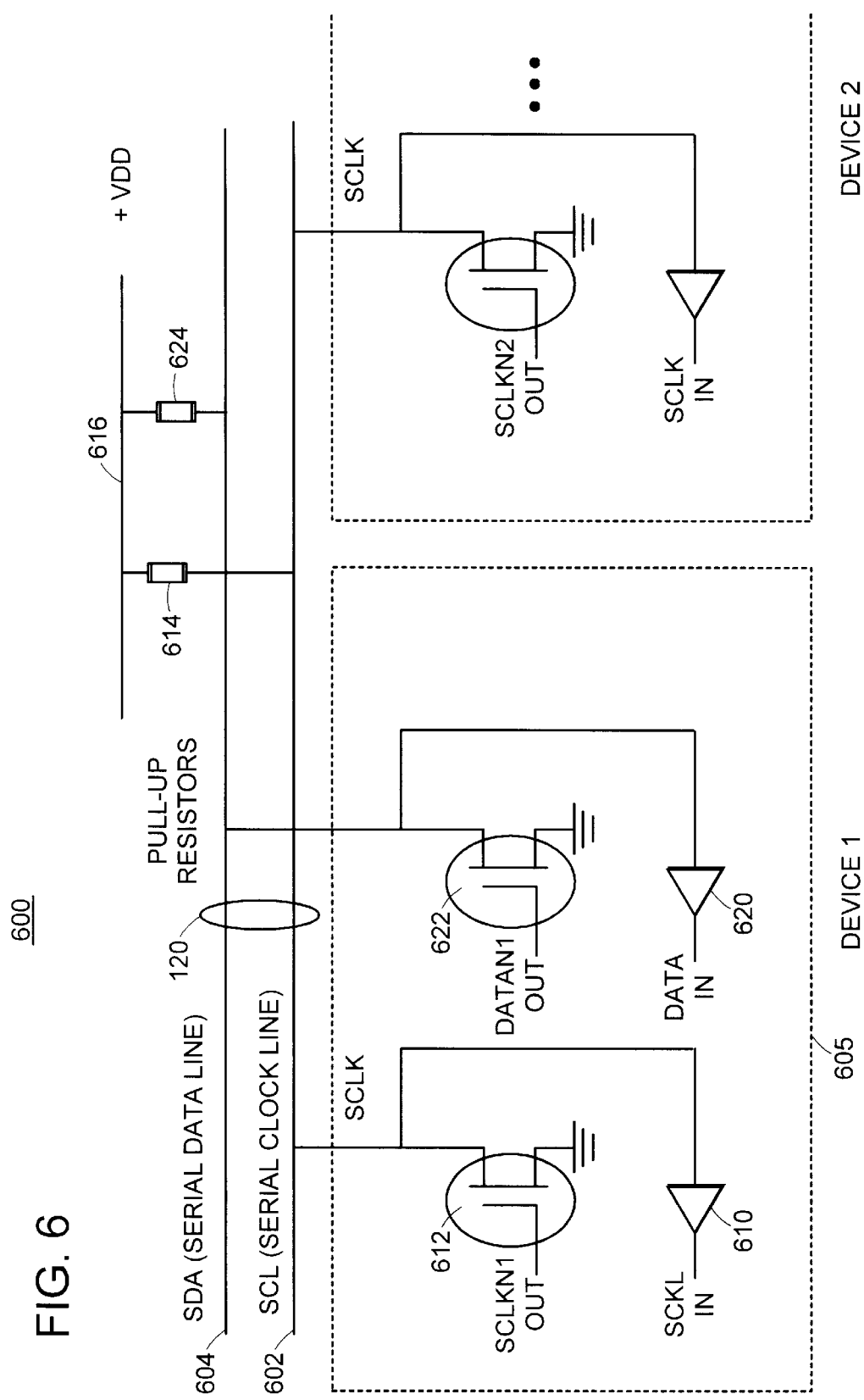
FIG. 6 is a schematic diagram of a two wire management bus.

Turning now specifically to FIG. 6, in the I2C standard implementation, management bus 120 is a two wire serial bus having serial clock line, SCL line 602 and having serial data line, SDA line 604. Devices are connected to the SCL line 602 serial clock line, and are connected to the SDA line 604 serial data line. The devices connected to management bus 120 SCL line 602 line and SDA line 604 are interfaces 123, 126, 127, 131, 135, 138, 140, 142, 146, etc., and management bus processor 460, and management bus interface 410 of network chip 402.

Device 1 605 is connected to SCL line 602 serial clock line by an operational amplifier 610 for input of clock pulses to the device 605, and for generating output pulses to SCL line 602 by a transistor 612. Transistor 612 operates through pullup resistor 614 to power supply line VDD 616. When transistor 612 is driven into conductance, SCL line 602 voltage goes to near ground value, and when transistor 612 is driven into cutoff SCL line 602 is driven near to the voltage of power supply line VDD 616. Transistor 612 permits other components, not shown, in device 1 605 to drive clock pulses onto SCL serial clock line 602.

Device 605 is connected to serial data line SDA line 604 by operational amplifier 620 for input of data pulses to device 605. Device 605 is connected through transistor 622 for output of data pulses from device 605 to SDA line 604. By operating through pullup resistor 624, when transistor 622 is driven into conductance SDA line 604 is driven near to ground potential, and when transistor 622 is driven into cutoff then SDA line 604 is driven near to power supply voltage VDD maintained on VDD line 616.

Figure 7:
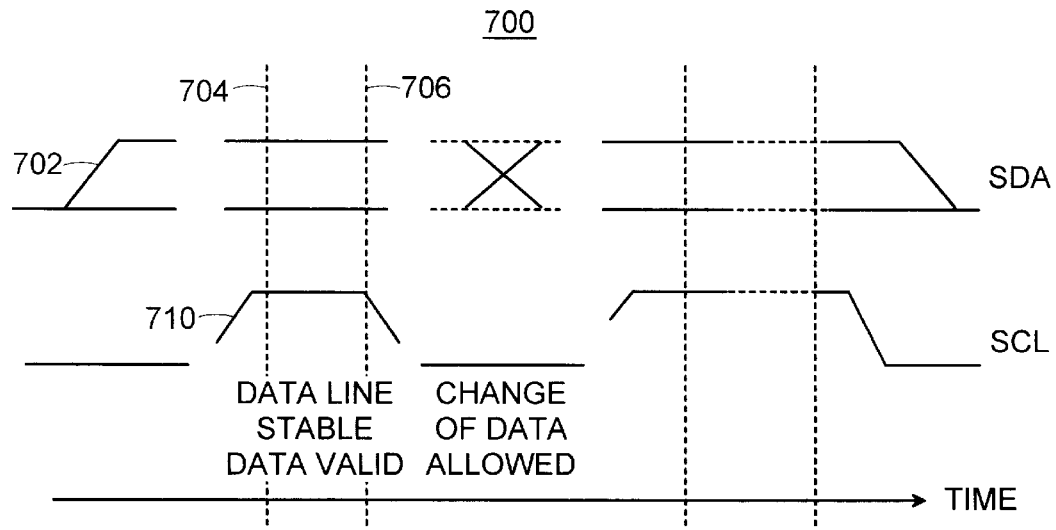
FIG. 7 is a timing diagram of data transfer on a two wire management bus.

Turning now to FIG. 7, there is shown a timing diagram for transfer of data by pulses on the serial clock line SCL line 602 and the serial data line 604. The voltage pulse 702 on serial data line SDA line 604 is maintained stable between the initial time 704 and final time 706, and during the time interval between initial time 704 and final time 706, the clock pulse 710 on serial clock line SCL line 602 rises and falls in order to provide a sampling time for the voltage on serial data line SDA line 604. One device is transmitting the pulses and all other devices may receive the pulses, by sampling the serial data line SDA line 604 under the control of the serial clock pulse on SCL line 602, during the time interval from time 704 to time 706.

Figure 8:
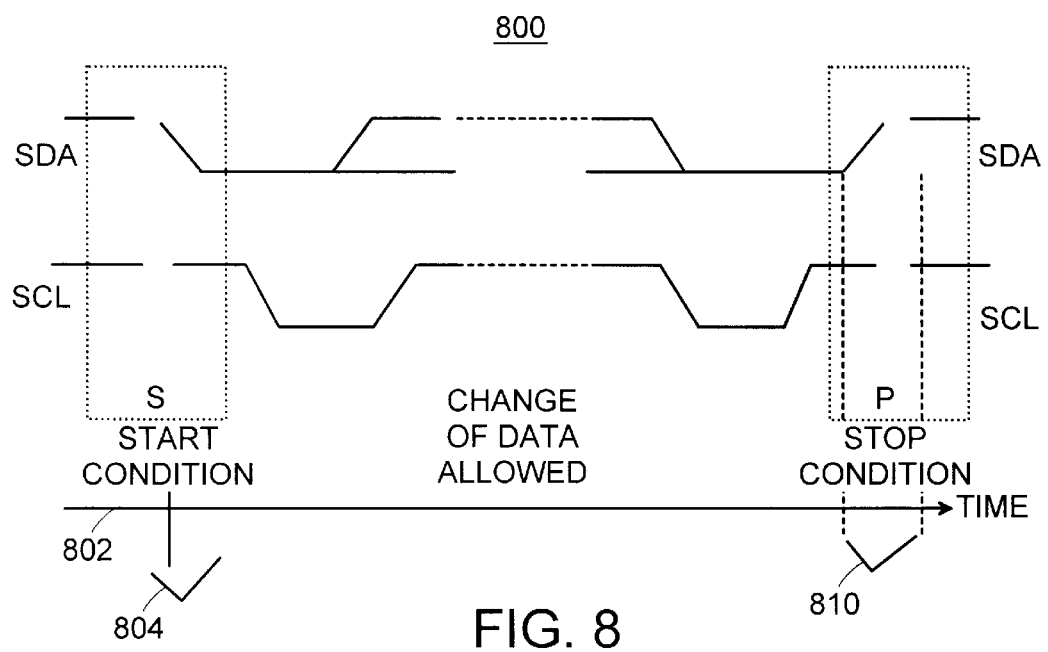
FIG. 8 is a timing diagram of a start condition and a stop condition on a two wire management bus.

Turning now to FIG. 8, there is shown a start transmission condition and a stop transmission condition. During idle time both the SCL line 602 line is maintained high, near power supply voltage VDD, and the SDA line 604 line is maintained high, as shown at time 802. The transmitting device transitions the SDA line 604 line to low while maintaining the SCL line 602 high in order to indicate to other devices that a transmission is starting, as shown at time interval 804. In order to indicate the stop condition after the conclusion of a transmission, the transmitting device drives both the SCL line 602 and the SDA line 604 line to a voltage near power supply voltage VDD, as shown in time interval 810.

Figure 9:
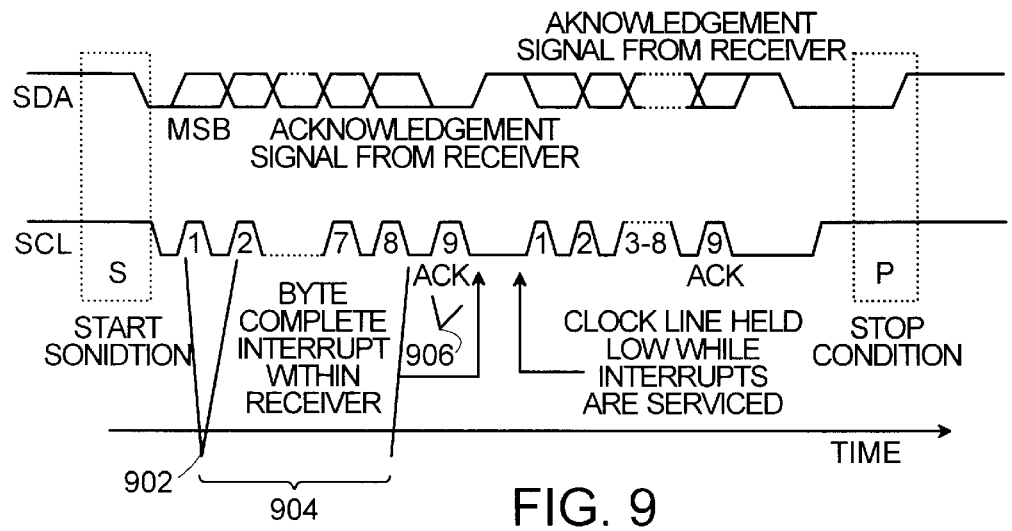
FIG. 9 is a timing diagram of data transfer on a two wire management bus.

Turning now to FIG. 9, transmission of data using the SCL line 602 and the SDA line 604 is shown. The transmitting device drives the SCL line 602 through its transistor 612 and drives the SDA line 604 through its transistor 622. The receiving device reads the SDA line 604 voltage during time intervals such as time interval 902. Eight bits 904 are transmitted as a byte by the transmitting device, and then the receiving device transmits an acknowledge bit 906. In the event that the receiving device fails to transmit the acknowledge bit, then a protocol determines the next event. For example, if the receiver does not transmit an acknowledge bit, the transmitter may execute a stop condition and then cease transmission.

Figure 10:
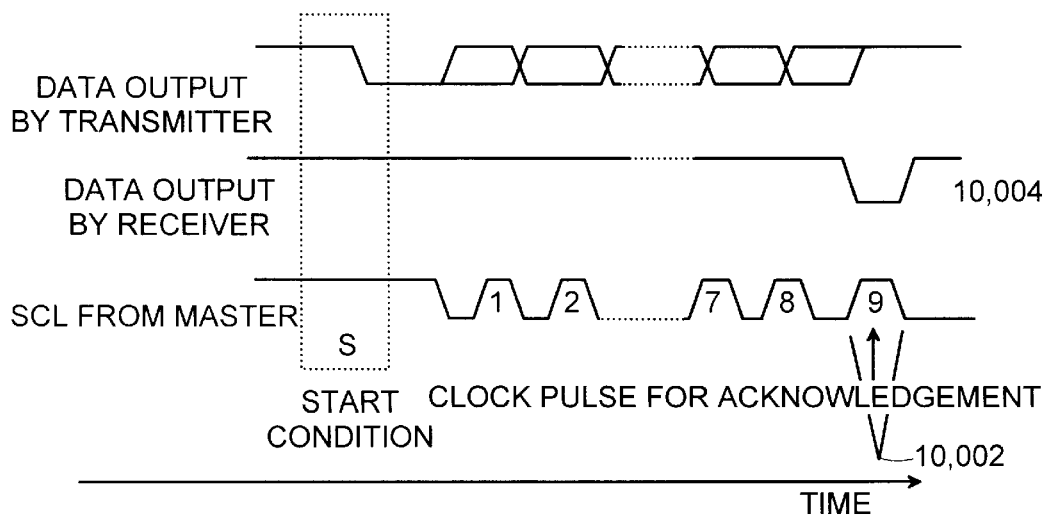
FIG. 10 is a timing diagram of an acknowledge condition on a two wire management bus.

Turning now to FIG. 10, a more detailed view of the acknowledge pulse is provided. During time interval 10,002, the receiver output line drives the SDA line 604 toward ground by driving its transistor 612 into conduction, as shown by pulse 10,004.

A transmitting device may transmit only if the SDA line 602 and SCL line 604 are both free. Two devices may both transmit the start signal during a minimum hold time. The devices must then arbitrate in order to determine which begins transmitting. Arbitration takes place by the devices monitoring the SDA line 604 and comparing the value which the device expects on the SDA line 604 with what it actually reads from the SDA line 604. A device transmitting a high level, and which measures a low level on the SDA line 604 will switch off. Arbitration may continue for many bits, until there is a bit mismatch between the data which the two devices are transmitting.

Figure 11:
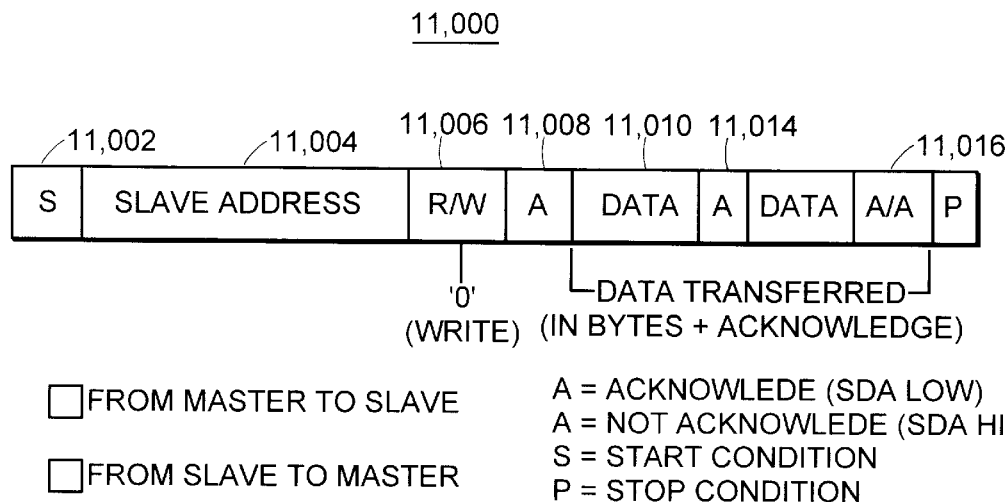
FIG. 11 is a field diagram of a data packet on a management bus written by a bus master to a slave.

Turning now to FIG. 11, there is shown a packet format 11,000 for data transmitted on the SDA line 604 and the SCL line 602. The start condition is generated by the transmitting device during bit interval 11,002. The destination address, referred to the slave address in I2C standard terminology, is transmitted as 7-bits in field 11,004. Field 11,006 is the one bit, 1-bit, r/w field, and contains a "0", indicating to the addressed device that it is a "write" message from the transmitting device, and that the addressed device is to receive the message. The two fields, the 7-bit address field 11,004 and the 1-bit r/w field 11,006 make up an 8-bit byte. Bit 11,008 is bit 9, the acknowledge bit, and is transmitted by the receiving device, as explained hereinabove.

Devices using the I2C format are divided into master and slave devices. Transmissions using the I2C bus protocol on management bus 120 are under the control of the master device. Data is transmitted as an 8-bit byte in field 11,010. The 9'th bit for acknowledgment by the receiver is in field 11,014. Data and acknowledgment bits are then exchanged until the transmitting device has transmitted its entire message. In the event that the receiving device cannot receive more data over the management bus line 120, the receive generates a NOT Acknowledge signal by leaving the SDA data line 604 high, rather than driving it low for an acknowledgment bit as shown in FIG. 8. A NOT acknowledge bit is shown in field 11,016. In response to receiving the NOT acknowledge bit from the receiving device, the transmitting device executes a stop condition 810 by driving both the clock line SCL line 602 and the data line SDA line 604 high, and ends its transmission.

Figure 12:
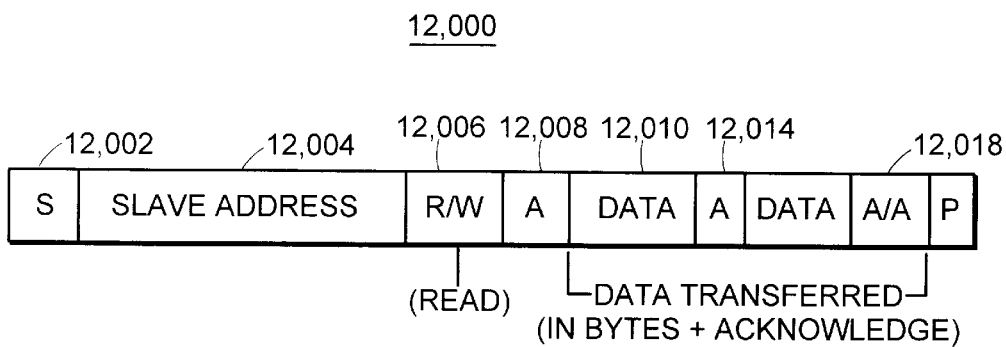
FIG. 12 is a field diagram of a data packet on a management bus read by a bus master, after being written by a slave.

Turning now to FIG. 12, a packet format for a master device to receive data from a slave device is shown. When a master device desires to receive data from a slave device, the master device first executes a start condition in field 12,002. Then the master device transmits the slave device address as a 7-bit address in field 12,004. The r/w field, the eighth bit, in field 12,006 is set to "1" to indicate to the slave that this is a read command from the master. That is, the master device expects to "read" data from the slave device. The slave device then transmits a 8-bit data byte in field 12,010. The master then transmits an acknowledge bit as bit 9 in field 12,014. The slave continues to transmit data bytes and the master continues to transmit acknowledge bits until the master is finished receiving data, when the master transmits a stop condition. However, the master may transmit a NOT acknowledge bit by holding the SDA line 604 high rather than drive it low, as shown in field 12,018. The master then executes a stop condition.

Figure 13:
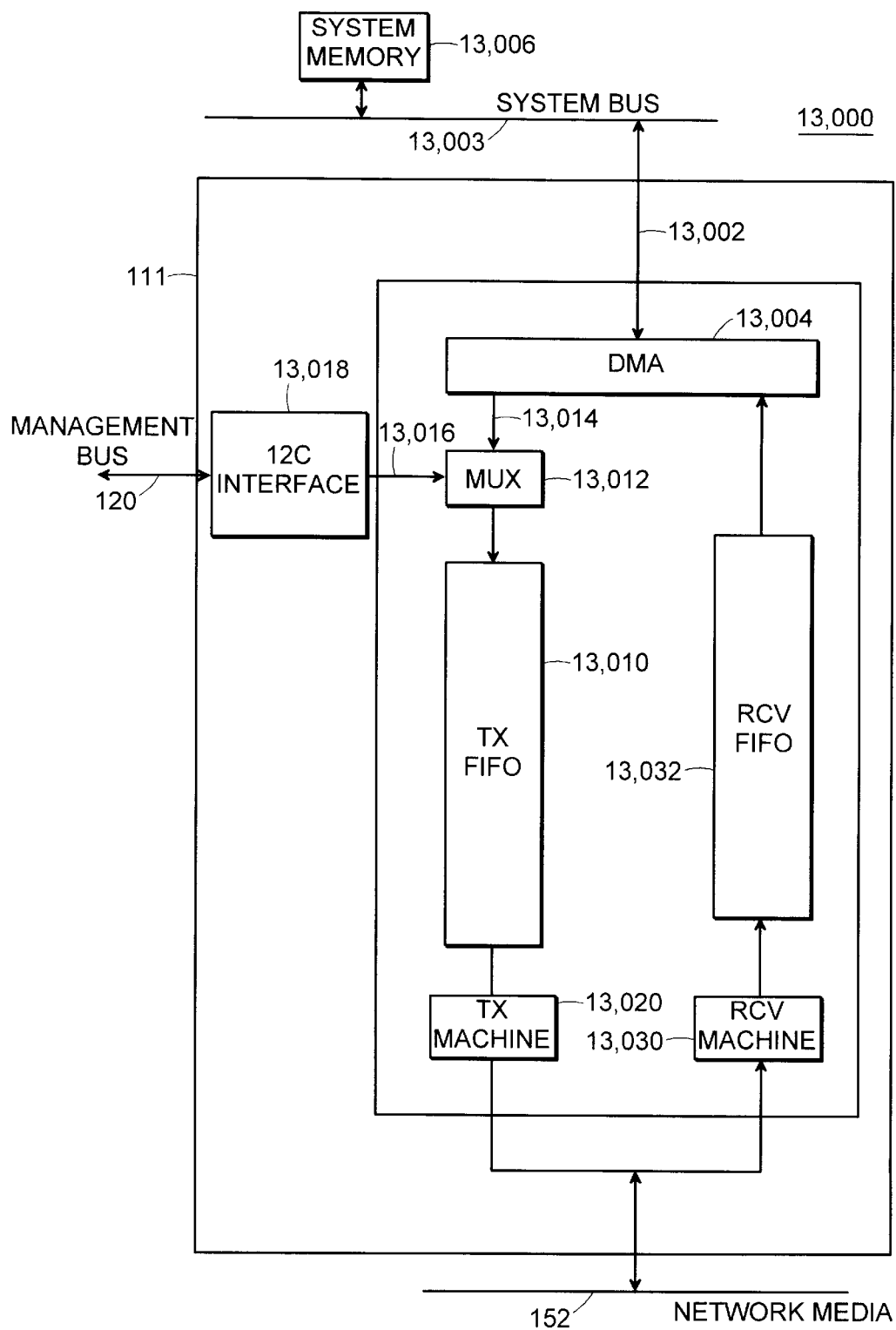
FIG. 13 is a block diagram of a network subsystem.

Turning now to FIG. 13, there is shown an exemplary block diagram 13,000 of network subsystem 111. Bus connection 13,002 connects to a system bus, as shown FIG. 1 by bus connection in 113, and as shown in FIG. 4 by bus connection 405. Bus connection 13,002 connects the system bus to Direct Memory Access machine, DMA machine 13,004. DMA machine 13,004 controls the data structures in system memory 13,006, and the data transfer protocol, for direct transfer of data between system memory 13,006 and network subsystem 111.

During transmit operation, data in system memory 13,006 is transferred over the system bus (or busses as in FIG. 1), through bus connection 13,002, and into transmit FIFO, TX FIFO 13,010, by passing through multiplexer MUX 13,012. MUX 13,012 has a first input along line 13,014 from DMA machine 13,004, and a second input along line 13,016 from I2C interface 13,018. MUX 13,012 has an output to transmit FIFO, TX FIFO 13,010. During ordinary operation of network interface 111, MUX 13,012 accepts data as input from DMA machine 13,004, and delivers the data to TX FIFO 13,010. Transmit machine TX machine 13,020, then reads out transmit FIFO 13,010, and transmits the data onto network media 152.

When I2C interface 13,018 has data which it has received from management bus 120, then MUX 13,012 gives priority to its input line 13,016 from I2C interface 13,018, and loads the data from the I2C interface into transmit FIFO 13,010. When the transmit FIFO 13,010 is loaded, then transmit machine 13,020 transmits the data from the I2C interface onto the network media 152 by reading transmit FIFO 13,010.

A speed difference between operation of the system bus 13,003 which, for example may operate at clock speeds of tens of MegaHertz, and the management bus which for example may operate at the slow clock rate of a few hundreds KiloHertz, is easily accommodated by the design shown in FIG. 13. During ordinary transmit operation, the system bus 13,003 (13,002) and the DMA machine 13,004 transfer data into transmit FIFO 13,010 at their ordinary transfer rate. Transmit machine 13,020 then empties transmit FIFO 13,010 at a transfer rate compatible with the technology of network media 152. In contrast, when multiplexer 13,012 accepts data from I2C interface 13,018, transmit FIFO fills at the slow clock rate of the management bus 120. Then after the transmit FIFO is ready for transmission, the transmit machine 13,020 again empties the transmit FIFO 13,010 at the transfer rate which is compatible with the technology of network media 152. That is, transmit machine 13,020 always empties transmit FIFO at network speed, independently of the clock rate used to write the data into the transmit FIFO 13,010.

Any network technology may be used for network media 152. In a preferred embodiment of the invention, network media 152 uses the standard CSMA/CD Ethernet technology of IEEE Standard 802.3. Alternatively, network media 152 could be a FDDI token ring, or an IBM token ring, or an ATM network using virtual circuits, or any other standard network technology.

The use of multiplexer 13,012 along with transmit FIFO 13,010 provides a backdoor transmission path from management bus 120 to network media 152. The ordinary front door for transmission of data onto network media 152, comprising system memory 13,006, system bus 13,003, and the machinery of direct memory access controlled by DMA machine 13,004 is totally bypassed when transmission of a message from management bus 120 is required. Data from management bus 120 is received by I2C interface 13,018, then I2C interface 13,018 gains control of multiplexer 13,012, the data from the I2C interface is loaded into transmit FIFO 13,010, and the data is transmitted onto network media 152 by transmit machine 13,020. Accordingly, in the event that any link in the system memory, system bus, main CPU, etc. is not working because of system failure, then so long as both network subsystem 111 is functional and management bus 120 is functional, an error message generated on management bus 120 can be transmitted onto network media 152.

During receive operation, a network data packet addressed to network subsystem 111 is detected by the receive machine, RCV 13,030, and is transferred from network media 152 into the receive FIFO, RCV FIFO 13,032. Data in receive FIFO 13,032 is then transferred by direct memory access machine 13,004 over system bus connection 13,004, and system bus 13,003 to system memory 13,006.

A management packet received from network media 152 may, for example, initiate a process in system CPU 107, and the process may initiate a data transfer on management bus 120, resulting in transmission of a message from I2C interface 13,018 to network media 152. For example, fan status through interface 123, temperature status through interface 127, power supply voltages through interface 135, etc., may, for example, be generated through system CPU 107 initiating a transaction by addressing management bus processor 150 through an interface such as interfaces 138, 140, 142, 144, 146.

Figure 14:
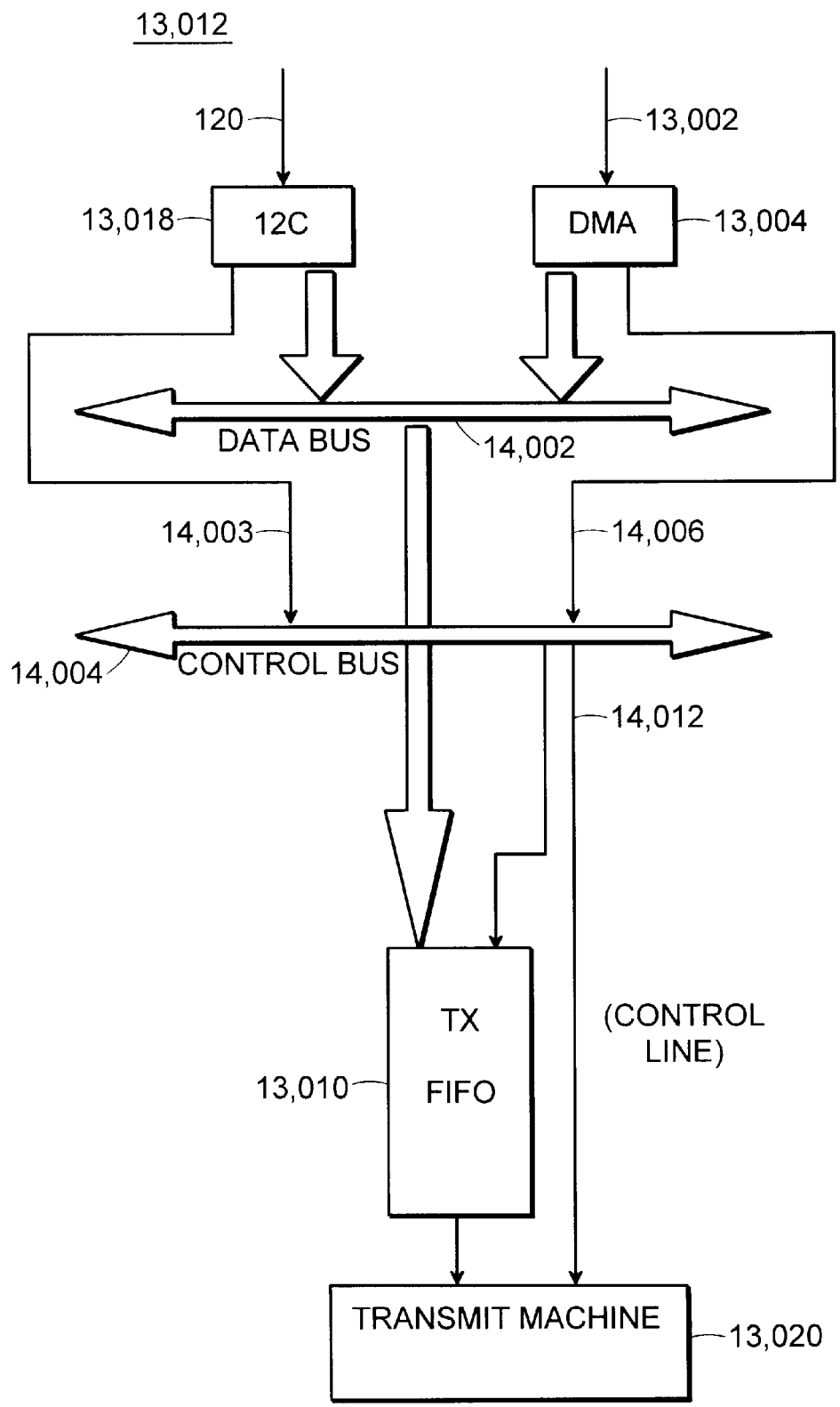
FIG. 14 is a block diagram of a multiplexer in a network subsystem.

Turning now to FIG. 14, a block diagram of an architecture of a multiplexer 13,012 is shown. I2C interface 13,018 receives data from management bus 120, and transfers the data through data bus 14,002 to transmit FIFO 13,010. I2C interface 13,018 transfers control signals along line 14,003 to control bus 14,004 in order to control transmit FIFO 13,010.

DMA machine 13,004 receives data from system bus 13,002, and transfers the data through data bus 14,002 to transmit FIFO 13,010. DMA machine 13,004 transfers control signals along line 14,006 to control bus 14,004 in order to control transmit FIFO 13,010.

Figure 15:
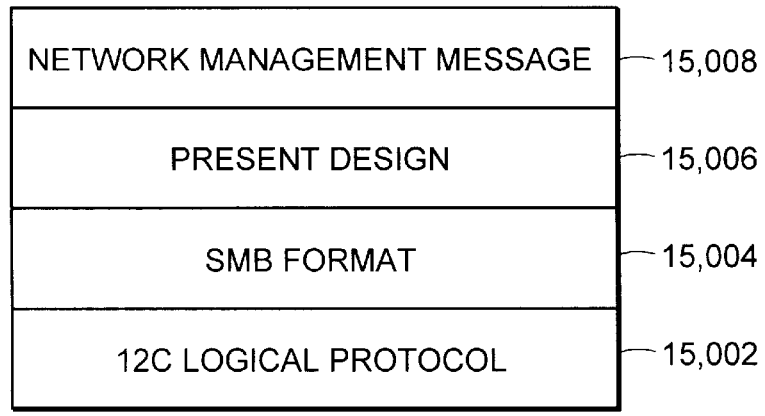
FIG. 15 is a block diagram of format levels on the management bus.

Turning now to FIG. 15, there is shown an exemplary set of protocols used in implementing protocol on management bus 120. In a preferred embodiment of the invention, the management bus 120 is implemented using the electrical and logical specifications of the I2C bus defined by Phillips Semiconductor in the documents incorporated by reference hereinabove, and as shown by block 15,002. Also, in a preferred embodiment of the invention, the data transfer protocol defined for the I2C bus by Intel Corporation referred to as the SMB bus protocol is adopted herein, as shown by block 15,004. The SMB bus protocol is described in the document *System Management Bus Specification, Revision* 1.0, Feb. 15, 1995, published by Intel Corporation, all disclosures of which are incorporated herein by reference. The SMB bus protocol defines data packets and fields for the data packets, and is generalized so that an implementor may define the data which goes in the SMB packets. In the present preferred embodiment of the invention, a generalized data format is defined, and that generalized data format is fitted into the SMB format.

The generalized data format of the present preferred embodiment of the invention is shown as block 15,006. The data format of block 15,006 is implemented in interfaces 123, 127, 131, 135, 138, 140, 142, 144, 146, etc., the management bus processor 150 and the I2C bus interface 13,018. The data format of block 15,006 is flexible in order to permit a person designing computer system 100 to define his own error messages.

A network management message is represented by data block 15,008. The network management message is designed by the person who designs the computer system 100. The network management message is made up of bytes. The computer system 100 error messages are transferred onto management bus 120, through the protocol of data block 15,006 where they are put into SMB format of data block 15,004. The messages in SMB format are transferred using the electrical and logical signals defined for the I2C bus.

The SMB bus protocol specifies at least eight different data transfer protocols in which a data transfer on the I2C bus may be organized. Only two of the SMB bus data transfer protocols are implemented in a preferred embodiment of the invention, the SEND BYTE protocol and the WRITE WORD protocol. The other SMB data transfer protocols are not necessary in the present preferred embodiment of the invention.

Figure 16:
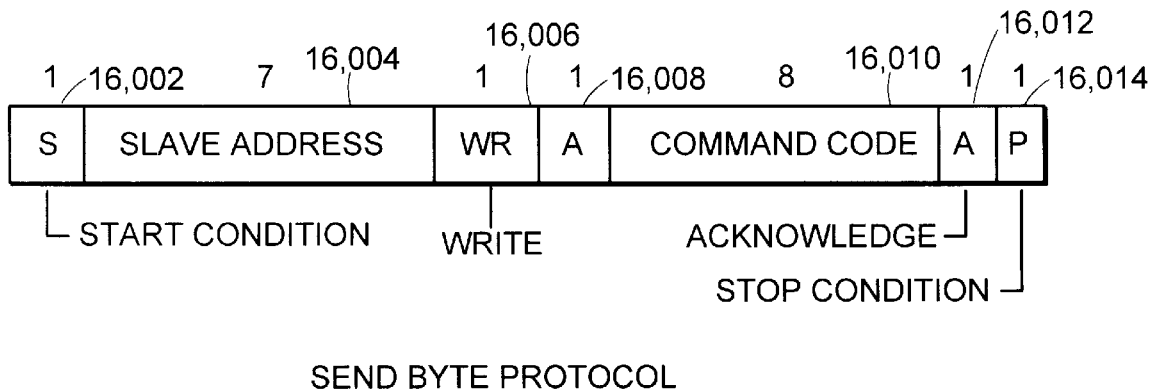
FIG. 16 is a data packet field diagram for a management bus.

Turning now to FIG. 16, the SEND BYTE protocol defined in the SMB bus protocol is shown. A device which has data to transmit becomes a bus master under the I2C protocol. The device, as a bus master, then initiates transmission of a data packet onto the management bus 120. The data packet has fields. The number of bits in a field are shown above the field in FIG. 16. The first field 16,002 is the START condition described in FIG. 8 through FIG. 12. The next field 16,004 is the seven bit address of the slave device to which the packet is addressed. The next field 16,006 is the read/write bit "Wr", and is set to "0" as the bus master is writing data. The next field 16,008 is the acknowledge field, and the slave device acknowledges to the bus master, as described in FIG. 8 through FIG. 12. The next field 16,010 is an eight bit command code. The next field 16,012 is an acknowledge field where the slave device acknowledges to the bus master, as in field 16,008. The final field 16,014 is a STOP condition, as defined in FIG. 8 through FIG. 12.

Figure 17:
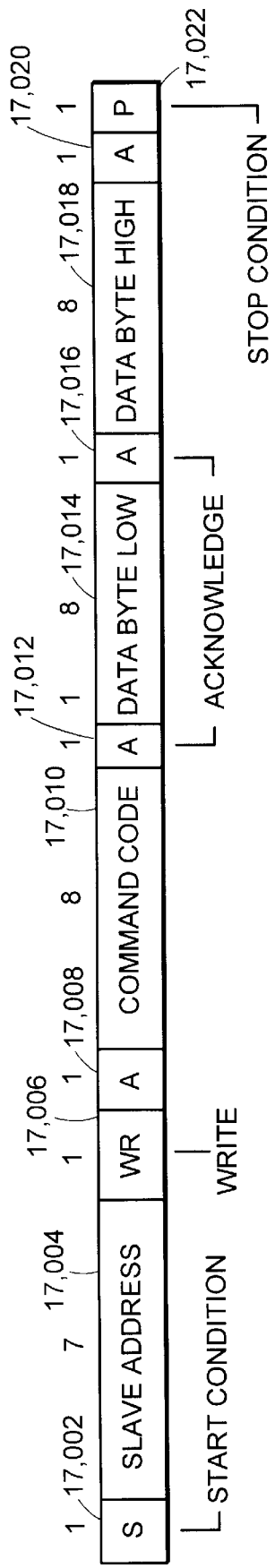
FIG. 17 is a data packet field diagram for a management bus.

Turning now to FIG. 17, the WRITE WORD protocol is shown. The first bit transmitted by the bus master is the START condition in field 17,002. The next field is the seven bit address 17,004 of the slave device to which the packet is directed. The next field is the read/write bit "Wr" 17,006, and this bit is set to "0" to indicate that data is being written by the bus master. The next field 17, 008 is the acknowledge bit transmitted by the slave device. The next field is an eight bit command code 17, 010 transmitted by the bus master. The next field 17, 012 is an acknowledge bit transmitted by the slave device. The next field 17,014 is an eight bit data byte transmitted by the bus master. The next field 17,016 is an acknowledge bit transmitted by the slave device. The next field 17,018 is a second eight bit data byte transmitted by the bus master. The next field 17, 020 is an acknowledge bit transmitted by the slave device. The last field is a STOP condition 17,022 transmitted by the bus master.

Of the at least eight SMB data transfer protocols, only the SEND BYTE and the WRITE WORD formats are used in the present preferred embodiment of the invention for communication between the management bus processor 150 and the management bus interface 202 in network chip 402. Interfaces 123, 127, 131, 135, 138, 140, 142, 144, 146 etc., may use any protocol that meets the I2C specification to transfer messages to management processor 150. Management processor 150 then must load the data bytes, and possibly the commands, which it receives into the I2C interface. Also, management processor 150 commands I2C processor to initiate a transfer of data into transmit FIFO 13,010 for transmission onto network media 152.

The I2C interface 13,018 presence on management bus 120, in a preferred embodiment of the invention, is only as a slave which does not transmit to the management bus 120. That is, the I2C interface 13,018 accepts bytes written to it over the management bus 120, however it ignores any commands for it to transmit data onto the management bus 120.

Figure 18:
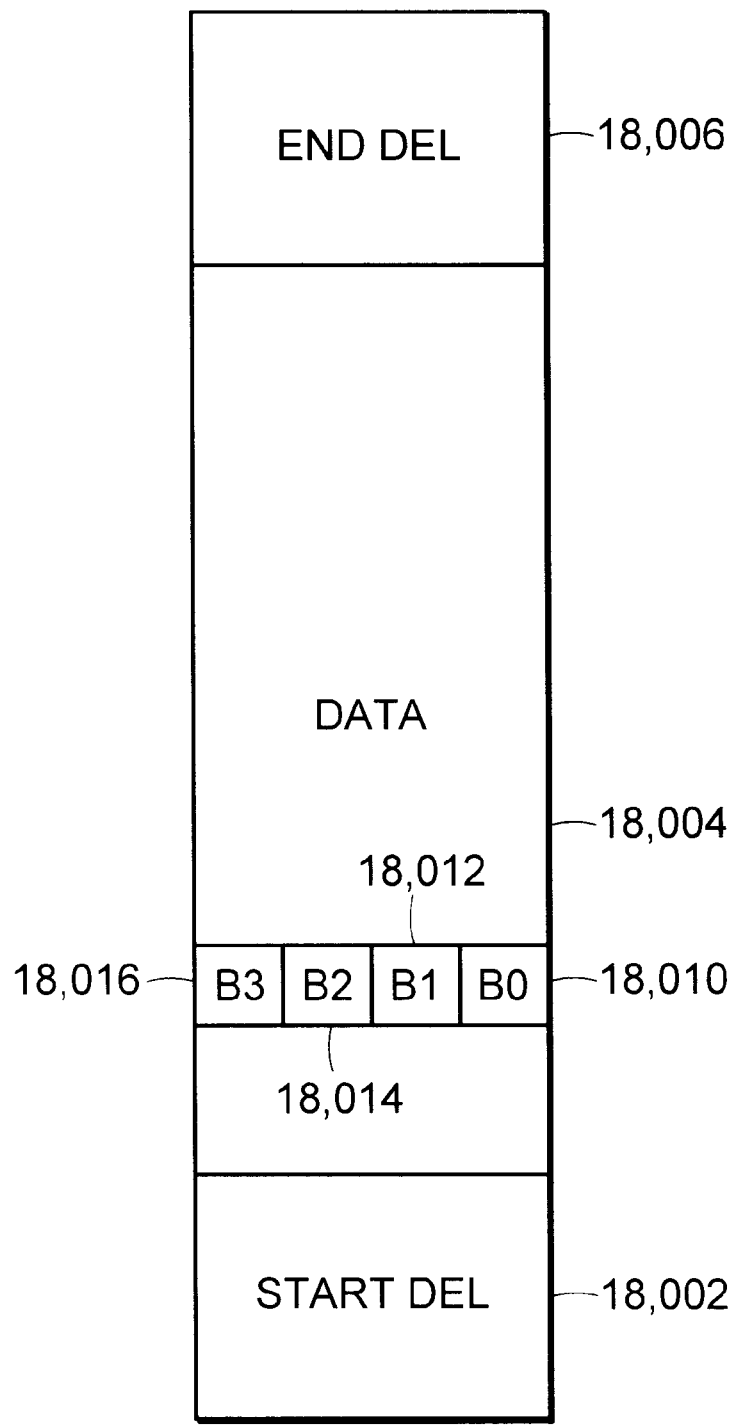
FIG. 18 is a data format diagram for data in a transmit FIFO.

Transfer of data from I2C interface 13,018 into transmit FIFO 13,010 will next be described. Turning now to FIG. 18, the format of data placed into transmit FIFO 13,010 is shown. The first field is a start delimiter 18,002. The second field is data field 18,004. And finally, the last field is end delimiter field 18,006. The start delimiter field 18,002 and the end delimiter field 18,006 are the same packet delimiters used in ordinary DMA machine data transmissions.

Transmit FIFO 13,010 has a four byte wide data path, as shown in data field 18,004 by the bytes, byte zero B0 18,010, byte one B1 18,012, byte two B2 18,014, and byte three B3 18,016. The four byte wide data path of transmit FIFO 13,010 provides a 32 wide total data path in the FIFO. The system bus 13,003 also has a 32 bit wide data path. Accordingly, DMA machine 13,004 can transfer data from system memory 13,006 along the system bus and into the transmit FIFO in a 32 bit wide data path.

Figure 19:
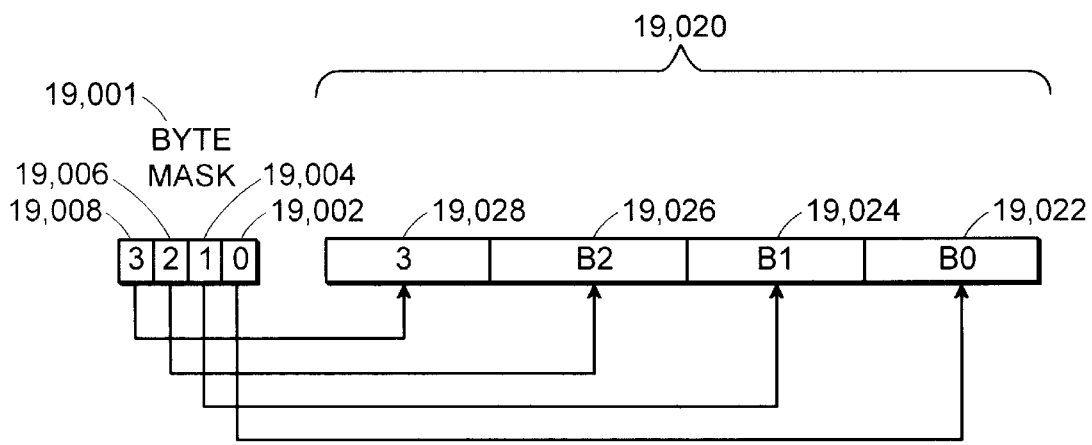
FIG. 19 is a field diagram for a byte mask and the bytes of a longword in a transmit FIFO.

Turning now to FIG. 19, the use of a byte mask to validate bytes in the transmit FIFO is shown. Bytes must be validated in the data path because a message transferred out of system memory may not have a number of bytes divisible by four, the width of the data path in bytes. Accordingly, each longword of four bytes in the data path has a four bit "byte mask". The byte mask is normally implemented in a transmit FIFO such as transmit FIFO 13,010. Byte mask 19,001 has four bits: bit "0" 19,002; bit "1" 19,004; bit "2" 19,006; and, bit "3" 19,008. Data path 19020 is four (4) bytes wide, that is 32 bits wide. Bit "0" 19,002 points to byte B0 19,022. Bit "1" 19,004 points to byte B1 19,024. Bit "2" 19,006 points to byte B2 19,026. Bit "3" points to byte B3 19,028. When a bit in byte mask 19,001 has the value "1", then the byte pointed to is valid data. On the other hand, when a bit in byte mask 19,001 has a value of "0", then the byte pointed to is not valid.

Figure 20:
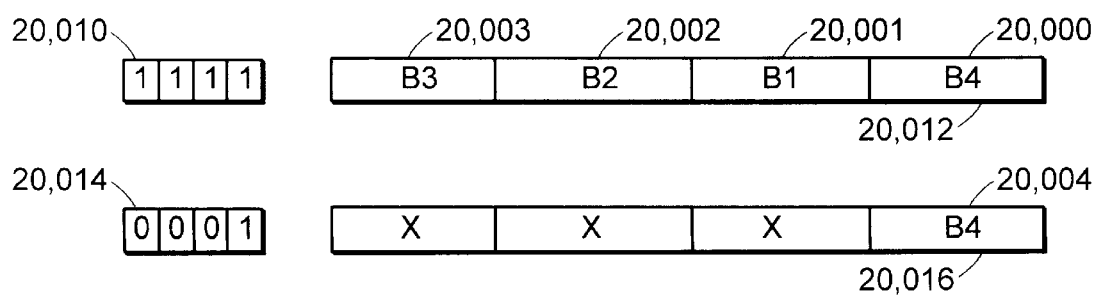
FIG. 20 is a field diagram of a byte mask and a longword in a transmit FIFO for a 5 byte message.
Figure 23:
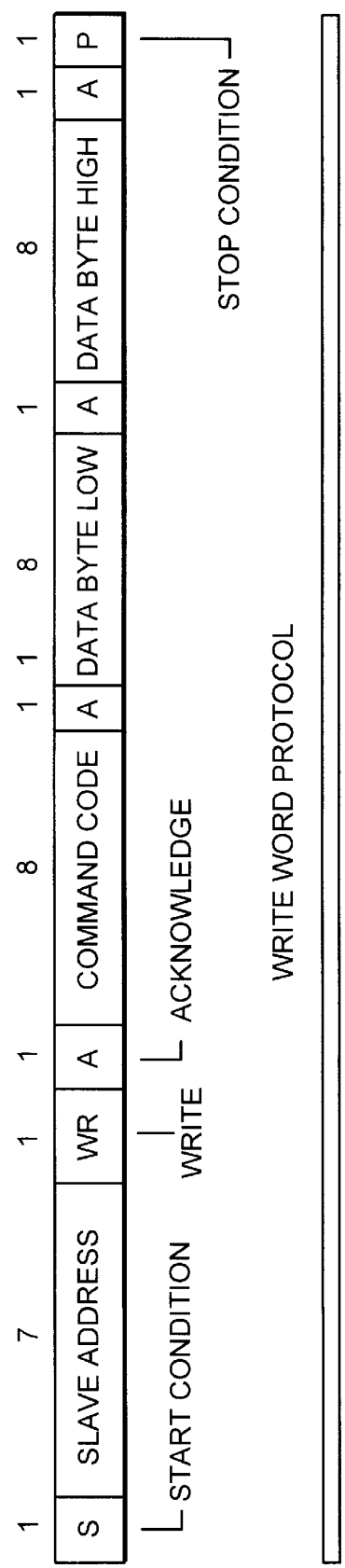
FIG. 23 is a field diagram of a write word protocol.

As an example, a five (5) byte message is shown in FIG. 20. The message, for example, as loaded into the transmit FIFO by the I2C interface has bytes B0 field 20,000, B 1 field 20,001, B2 field 20,002, B3 field 20,003, and B4 field 20,004. The first longword 20,012 has the associated byte mask 20,010 having four bits each of value "1", which point to the bytes B0 20,000, B1 20,001, B2 20,002, and B3 20,003. The second longword 20,016 has the associated byte mask 20,014 having one bit of value "1" pointing to byte B4 20,004, and the other bits having a value of "0" pointing to the three bytes of longword 20,016 which do not contain valid data.

The I2C interface, on the network subsystem, receives data from all of the other interfaces on the I2C bus and stores the data into memory within the I2C chip. The I2C interface then transfers data into the management bus interface 202 within network chip 402.

There are two transfers on the I2C bus from the I2C processor (management bus processor 150) to the I2C interface (management bus interface 202) for each longword in the command because each WRITE WORD command from the SMB protocol transfers only 2 bytes from the I2C processor to the I2C interface, and each longword comprises 4 bytes.

Control signals within network chip 402 then cause a transfer of the data in the management bus interface 202 into the transmit FIFO of MAC machine 414.

The SMB packet protocol is given as follows. SMB Packet Protocol

Above the I2C bus protocol, the network chip 402 implements a sub-set of the SMB packet protocol with unique definitions suited for the network chip 402 internal design. This protocol allows the network chip 402 and the Microcontroller (management bus processor 150) to transfer control and packet data in order to transmit a packet on the network wire.

After each I2C start condition, the network chip 402 compares the 7 bits address to its own address. If matches, the network chip 402 interprets the next receiving data bytes as one byte of control and the following bytes of data.

The network chip 402 supports the two following protocols of the SMB protocol:
Send Byte protocol
Write Word protocol
Send Byte Protocol:

The Send Byte protocol is shown in FIG. 21. The Send Byte protocol decodes as follows (received left to right): Start condition, 7 bits of address, 1 bit WR, Ack, 1 byte command, Ack, Stop condition.
Write Word Protocol:

The Write Word protocol decodes as follows: Start condition, 7 bits of address, 1 bit WR, Ack, 1 byte command, Ack, 1 byte data, Ack, 1 byte data, Ack, Stop condition.
Network Chip 402 Command Set The command set of the network chip 402 is described below, as the START_DELIMITER, the DATA, END_DELIMITER, and the RESET commands.

1. START_DELIMITER:

The START_DELIMITER fields are shown in FIG. 22. A Start_delimiter is sent each time a new packet is transferred over the I2C bus.

Command code: 0000CP01 (binary)

C: Add-CRC.

When this bit is set, the network chip 402 will calculate and append the CRC to the transmitted packet.

P: Disable Padding.

When this bit is set, the network chip 402 will not add padding to the packet. When this bit is reset to zero, the network chip 402 will append zero bytes to packets shorter than 64 bytes. Packets that will be padded will also have CRC calculated and appended regardless of the add CRC bit.

Protocol: Send Byte

2. DATA:

The frame data are transferred by the Data command.

Data sent to the network chip 402 over the I2C must be longword aligned. This means that an EVEN number of Data Command only should be issued. A byte mask allows masking the invalid bytes of the last longword if needed.

Command code: 0000MM10 (binary)

MM—are two bytes mask bits:

Bit >2≦: Data Byte Low 's mask

Bit >3≦: Data Byte High's mask.

1: Valid byte

0: Invalid byte

Protocol: Write Word protocol is used.

The first received byte is the least significant byte and the second received byte is the most significant byte of the word. The first received byte will be transmitted first on the Ethernet wire.

3. END_DELIMITER:

The end delimiter is sent after sending all the packet data on the I2C interface to signal the end of the frame.

Command code: 00000011 (binary)

Protocol: Send Byte protocol is used.

4. RESET:

The Reset command allows the microcontroller to reinitialize the network chip 402.

Command code: 00000100 (binary)

Protocol: Send Byte protocol is used.

The START delimiter and the END delimiter are each from command type "Send Byte". Two versions of the command codes are used for the START delimiter, and the two options for the command codes of the START delimiter have the following meanings:

0000 1001 add CRC, add padding 0000 0101 no CRC, no padding

Figure 24:
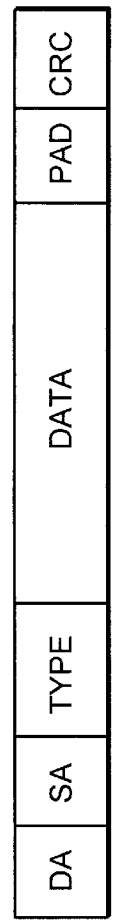
FIG. 24 is a field diagram of an Ethernet data packet.

In a preferred embodiment of the invention, an Ethernet CSMA/CD protocol is used on the network media 152, and the Ethernet data packet has a CRC field, as shown in FIG. 24. The command code of the START delimiter is used to designate how the CRC field is to be calculated. When the command code of the START delimiter has the value "0000 1001", the transmit FIFO and the transmit machine add padding in PAD field so that the Ethernet data packet has the minimum necessary length, and then they compute the CRC and add it to the end of the Ethernet packet. In contrast, when the command code of the START delimiter has the value of "0000 0101", then the transmit FIFO and the transmit machine do not add padding and do not add the CRC, and these jobs are handled by the I2C interface and the management bus processor 150. In the option where the command code has the values "0000 0101", the CRC tests the end-to-end integrity of the transfer of data between the I2C interface of the management bus processor and the destination Ethernet controller.

The receiving station on the network calculates its CRC as the network packet is received, and if the receiver's locally calculated CRC does not agree with the CRC in the Ethernet packet, the usual diagnosis is that the network transmission corrupted the data. However, when the CRC tests transmission over the I2C bus, the problem may be corruption of data in the I2C management bus between the management bus processor and the I2C interface.

As a further alternative embodiment of the invention, both the I2C processor 150 and the transmit machine 13,020 may calculate the CRC in order to test the integrity of the transmission over the I2C bus.

OPERATIONAL EXAMPLES

When power is turned on in a computer, the computer often executes a self test as part of the "boot up" process. Timing in the "boot up" process may be controlled by a ROM, or read only memory, which is mounted on a card in the computer. For example, the self test may be performed by software executing in the system processor, and the self test software may execute before the operating system is loaded into the system processor. The self test software is read from a ROM, possibly the same ROM that controls the timing of the boot up process, or alternatively, from a different ROM. In the event that the computer fails the self test, then the normal action of the self test software is to write an error message to the monitor associated with the computer, or to write a message to a printer connected to the computer.

In the present invention, management bus processor 150 monitors the boot up process, for example, by sensing power activity through interface 134, by sensing of CPU activity through interface 138, by sensing boot ROM activity through interface 140, by sensing bus activity through interfaces 142, 144, 146, etc. Management bus processor 150 learns that computer system 100 failed a power on boot up self test by signals received from the various interfaces. Upon learning that the computer system failed a self test, management bus processor 150 transmits an error message to I2C bus interface 13,018, and initiates transmission of an error message on network media 152.

The error message transmitted onto the network media 152 is received by a monitoring station, and may be detected by a monitoring application program running on the monitoring station 504. Alternatively, a network manager person 502 may detect the arrival of the error message at a monitor station 504 as shown in FIG. 5. The error message contains addressing information so that the computer which failed the self test can be identified. In any event, a repair technician is then dispatched to perform service on the computer which failed the self test.

As a further example of using the present invention, the event of a computer crash may be transmitted to a network monitor 502, 504. A computer crash is an event in which the computer ceases ordinary operation. A wide variety of events may cause a computer to crash. A few events which may cause a computer to crash include: a loss of electrical power to the computer; a momentary interruption of electrical power to the computer; a head crash on a disk storage unit; a process running on the computer may cause a software error and cause program execution on the computer to cease; two unrelated process may write to the same memory location, thereby producing a software collision which causes the executing process to halt when it reads that memory location; etc. A crash may be detected by one of the interfaces connected to the management bus 120.

A power failure, or momentary power failure, may be detected by power supply interface 135; a loss of CPU activity may be detected by CPU interface 138; loss of bus activity may be detected by any of the bus monitoring interfaces 142, 144, 146, etc. When any interface detects a failure condition, the interface transmits an error message to management bus processor 150. Management bus processor 150 then transfers an error message to I2C interface 13,018, and I2C interface then initiates transmission of an error message onto network media 152. The computer system which failed is identified by the addressing information placed in the network message. The network monitor station 504, and the person 502 monitoring the network, are then informed that the computer system failed, and a service technician is dispatched to fix the computer.

In a first exemplary embodiment of the invention, the network subsystem operates from battery 432, and also management bus processor 150, 430 operates from battery 432, as do the management bus interfaces 123, 127, 131, 135, 138, 140, 142, 144, 146. Accordingly, the error messages can be transmitted onto network media 152 even when the system power supply becomes non-functional.

In a second exemplary embodiment of the invention, the system power supply is used to power some components of the management bus, and may also be used to power the network subsystem. The system power supply must then be operational in order for an error message to be transmitted onto network media 152. Powering management bus components from the system power supply gives a cheaper design than including battery 432 in the computer system, however this design provides less ability to inform a network monitor that the computer system is not functional.

It is to be understood that the above described embodiments are simply illustrative of the principles of the invention. Various other modifications and changes may be made by those skilled in the art which will embody the principles of the invention and fall within the spirit and scope thereof.

What is claimed is:

1. An apparatus to transmit messages on a computer network, comprising:

a network subsystem for a computer, said computer having a system bus and at least one main processor connected to said system bus and at least one memory unit connected to said system bus, said network subsystem being connected and operative to transfer packets from a network through said system bus to said at least one memory unit and to transfer packets from said at least one memory unit to said network;

means to initiate and execute a self-test to check the system components;

a management bus processor to monitor status of components of said computer, said management bus processor connected to a management bus, said management bus being coupled to sensors for sensing status of system components and connected to transfer system component status information to said management bus processor from said components, and said management bus connected to said network subsystem; and interface means, responsive to data carried on said management bus, in said network subsystem for transmitting said system status information onto said network, said apparatus including error message generating means, in the event that said computer in a self-test shows a fault which prevents said system bus from transmitting data from said at least one memory unit to said network subsystem, for generating an error message.

2. The apparatus as in claim 1 further comprising:

a battery to operate said network subsystem and said management bus processor, to transmit said system component status information onto said network in the event that a power failure occurs within said computer.

3. The apparatus as in claim 1 further comprising:

means for transmitting a result of a self test over said management bus to said network subsystem;

means, responsive to receiving said result of a self test from said management bus, for said network subsystem to transmit said result of a self test onto said network, in the event that said computer fails said self test.

4. The apparatus as in claim 1 further comprising:

means, responsive to said computer crashing, for said network subsystem to transmit a message informing a network monitor that a crash occurred.

5. The apparatus as in claim 1 further comprising:

a direct memory access machine in said network subsystem, said direct memory access machine to transfer data from said at least one memory unit to said network subsystem for transmission of said data onto said network;

a multiplexer having a first input and a second input and having an output, said first input connected to said means in said network subsystem for transmitting said system status information onto said network, said second input connected to said direct memory access machine, said multiplexer to direct data from said first input or said second input to said output for transmission onto said network.

6. The apparatus as in claim 5 further comprising:

means for said multiplexer to give priority to messages transmitted by said means in said network subsystem for transmitting said system status information onto said network, to resolve a contention between said status information and said data from said direct memory access machine to permit transmission of said status information.

7. Apparatus including a semiconductor device for use in a computer network, comprising:

means for said semiconductor device to send messages over a computer network;

means for initiating a computer in said computer network to execute a self-test such as during booting, to check soundness of components of said computer and said network; and means, responsive to said computer failing said self-test, for said semiconductor device to transmit an error message to a second computer connected to said network, said error message being transmitted by said semiconductor device.

8. A method of transmitting error messages on a computer network, comprising: transferring packets from a network through a system bus to at least one memory unit and transferring packets from said at least one memory unit to said network by direct memory access;

transferring system status information of at least one component of a computer to a management bus processor, and said management bus processor transferring data to a network subsystem;

initiating and executing a self-test to check functioning of said at least one component of said component of said computer;

transmitting said system status information onto said network in response to data carried on said management bus in the event of a failure in said computer as shown by said self-test, said failure preventing said system bus from transferring data.

9. The method as in claim 8 further comprising:

operating from a battery both said network subsystem and said management bus processor, to transmit said system status information onto said network in the event that a power failure occurs within said computer.

10. The method as in claim 8 further comprising:

transmitting a result of a self test over said management bus to said network subsystem;

transmitting said result of a self test onto said network in the event that said computer fails said self test.

11. The method as in claim 8 further comprising:

transmitting a message informing a network monitor that a crash occurred, in response to said computer crashing.

12. The method as in claim 8 further comprising:

transferring data from said at least one memory unit to said network subsystem for transmission of said data onto said network by a direct memory access machine;

operating a multiplexer having a first input and a second input and having an output, said first input connected to said means in said network subsystem for transmitting said system status information onto said network, said second input connected to said direct memory access machine, said multiplexer directing data from said first input or said second input to said output for transmission onto said network.

13. The method as in claim 12 further comprising:

giving priority by said multiplexer to messages having said system status information, to resolve a contention between said status information and said data from said direct memory access machine to permit transmission of said status information.

14. A method of operating a semiconductor device in a computer, which is part of a computer network, comprising:

sending messages over the computer network by said semiconductor device;

initiating said computer to execute a self test to check for soundness of components; and transmitting an error message to a second computer connected to said network by said semiconductor device, in response to said computer failing said self test.

* * * * *